US012625418B2

(12) United States Patent
Wakabayashi et al.

(10) Patent No.: US 12,625,418 B2
(45) Date of Patent: May 12, 2026

(54) PROJECTOR

(71) Applicant: SEIKO EPSON CORPORATION, Tokyo (JP)

(72) Inventors: Shinichi Wakabayashi, Suwa (JP); Masato Kadotani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 365 days.

(21) Appl. No.: 18/522,462

(22) Filed: Nov. 29, 2023

(65) Prior Publication Data

US 2024/0176219 A1 May 30, 2024

(30) Foreign Application Priority Data

Nov. 29, 2022 (JP) ................................. 2022-190074

(51) Int. Cl.
*G03B 21/14* (2006.01)
*G03B 21/20* (2006.01)
(52) U.S. Cl.
CPC ......... *G03B 21/147* (2013.01); *G03B 21/142* (2013.01); *G03B 21/2033* (2013.01)
(58) Field of Classification Search
CPC .... G03B 21/147; G03B 21/28; G03B 21/006; G03B 21/142; G03B 21/2033
USPC ......................................................... 353/69
See application file for complete search history.

(56) References Cited

U.S. PATENT DOCUMENTS

2005/0078278 A1* 4/2005 Uehara ................ G02B 27/283
348/E9.027
2019/0066553 A1* 2/2019 Ohkoba ................ G09G 3/007
2020/0159094 A1* 5/2020 Wakabayashi ......... H02K 33/16
2020/0174246 A1* 6/2020 Wakabayashi ....... G03B 21/006

FOREIGN PATENT DOCUMENTS

JP H07-319066 A 12/1995

* cited by examiner

*Primary Examiner* — Magda Cruz
(74) *Attorney, Agent, or Firm* — Dority & Manning, P.A.

(57) ABSTRACT

A projector includes a single light modulator that has a pixel region containing a plurality of pixels, and a pixel shifting device configured to switch the optical path of image light output from the light modulator between a reference optical path and a shifted optical path. A plurality of sub-pixels that are segmented by a black matrix and output light having different colors form each of the pixels in the pixel region of the light modulator. The pixel shifting device positions the image light traveling along the reference optical path at a reference display position on the projection receiving surface, and positions the image light traveling along the shifted optical path at a shifted display position on the projection receiving surface to superimpose the image light output from the sub-pixels at the shifted display position on a region corresponding to the black matrix at the reference display position.

16 Claims, 10 Drawing Sheets

FIG. 10

PROJECTOR

The present application is based on, and claims priority from JP Application Serial Number 2022-190074, filed Nov. 29, 2022, the disclosure of which is hereby incorporated by reference herein in its entirety.

BACKGROUND

1. Technical Field

The present disclosure relates to a projector.

2. Related Art

JP-A-7-319066 discloses a projector using a single liquid crystal panel as a light modulation apparatus. In the projector, the light output from a light source enters the liquid crystal panel, image light modulated by the liquid crystal panel is caused to exit out of a projection lens, and the image light having exited out of the projection lens is reflected off a mirror to redirect the projected image light. JP-A-7-319066 is an example of the related art.

Such a single-panel projector using a single liquid crystal panel has advantages of compactness, lightweight, excellent portability, and low cost. On the other hand, the single-panel projector has a problem of poorer resolution than that of a three-panel projector using three liquid crystal panels.

It has therefore been desired to provide a new technology that can increase the resolution while maintaining the advantages of the single-panel projector.

SUMMARY

According to an aspect of the present disclosure, there is provided a projector including a light source, a single light modulator that has a pixel region containing a plurality of pixels and modulates light output from the light source to generate image light, a pixel shifting device configured to switch an optical path of the image light output from the light modulator between a reference optical path and a shifted optical path, and a projection system that projects the image light incident from the pixel shifting device onto a projection receiving surface. A plurality of sub-pixels that are segmented by a black matrix and output light having different colors form each of the pixels in the pixel region of the light modulator. The pixel shifting device positions the image light traveling along the reference optical path at a reference display position on the projection receiving surface, and positions the image light traveling along the shifted optical path at a shifted display position on the projection receiving surface to superimpose the image light output from the sub-pixels at the shifted display position on a region corresponding to the black matrix at the reference display position.

BRIEF DESCRIPTION OF THE DRAWINGS

FIG. 10 shows key portions of a displayed image achieved by the pixel shifting in a third variation.

DESCRIPTION OF EMBODIMENTS

Figure 1:
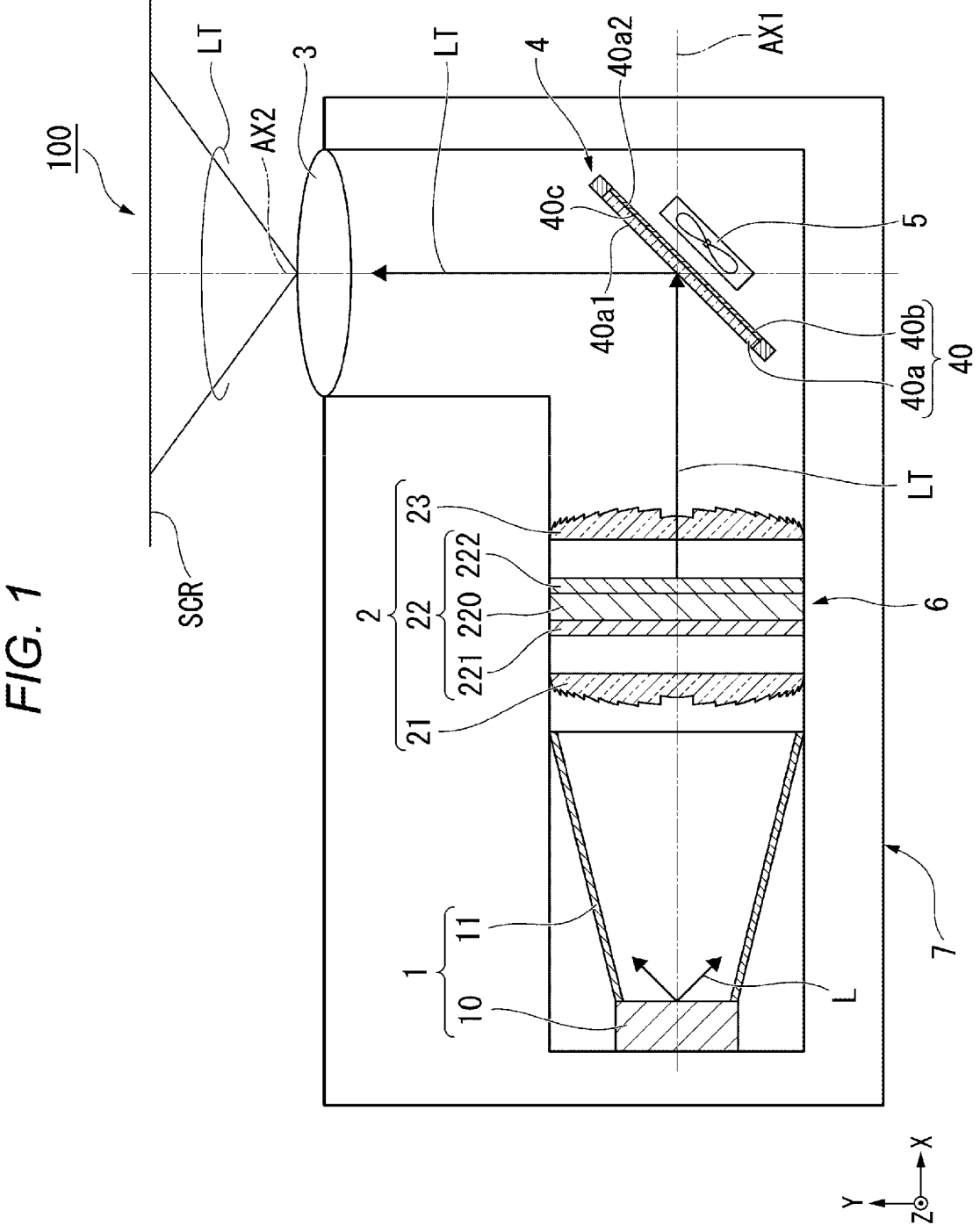
FIG. 1 shows a schematic configuration of a projector according to a first embodiment.

Embodiments of the present disclosure will be described below in detail with reference to the drawings. In the drawings used in the description below, a characteristic portion is enlarged for convenience in some cases for clarity of the characteristic thereof, and the dimension ratio and other factors of each component are therefore not always equal to actual values.

First Embodiment

FIG. 1 shows a schematic configuration of a projector 100 according to the present embodiment.

The projector 100 according to the present embodiment is a projection-type image display apparatus that displays a color image on a screen SCR, which is a projection receiving surface, as shown in FIG. 1.

The projector 100 includes a light source unit 1, an image generator 2, a projection system 3, a pixel shifting device 4, a fan 5, an inner enclosure 6, and an exterior enclosure 7.

In the following description, an XYZ coordinate system shown in FIG. 1 is used in some cases to describe the arrangement of the members described above. In FIG. 1, the axis X is an axis extending along a first optical axis AX1, which is a first reference axis along which some of the optical parts in the projector 100 are arranged. The axis Y is perpendicular to the axis X, is an axis extending along a second optical axis AX2, which is a second reference axis along which some of the other optical parts in the projector 100 are arranged, and is an axis extending along the direction in which image light LT is projected onto the screen SCR. The axis Z is an axis perpendicular to the axes X and Y and extending along the upward-downward direction of the projector 100.

In the present embodiment, for example, the opposite directions along the axis Z are collectively referred to as an "upward-downward direction Z" in the projector 100; the direction toward the positive end of the direction Z is referred to as an "upper side", and the direction toward the negative end of the direction Z is referred to as a "lower side". The opposite directions along the axis X are collectively referred to as "rightward-leftward direction X" in the projector 100; the direction toward the positive end of the direction X is referred to as a "right side", and the direction toward the negative end of the direction X is referred to as a "left side". The opposite directions along the axis Y are collectively referred to as a "frontward-rearward direction Y" in the projector 100; the direction toward the positive end of the direction Y is referred to as a "front side", and the direction toward the negative end of the direction Y is referred to as a "rear side".

The upward-downward direction Z, the rightward-leftward direction X, and the frontward-rearward direction Y are merely names for describing the arrangement of the constituent members of the projector 100, and do not specify the actual installation postures or orientations of the constituent members in the projector 100.

The inner enclosure 6 fixes the light source unit 1, the image generator 2, the projection system 3, the pixel shifting device 4, and the fan 5 thereto. The light source unit 1, the image generator 2 and the pixel shifting device 4 are arranged along the first optical axis AX1 in the inner enclosure 6. The pixel shifting device 4 and the projection system 3 are arranged along the second optical axis AX2 in the inner enclosure 6.

The projector 100 according to the present embodiment, in which the constituent parts thereof are fixed to the inner enclosure 6, is easy to assemble. The exterior enclosure 7 has the shape of a substantially cuboidal box formed of a plurality of walls, and constitutes the exterior of the projector 100.

The light source unit 1 is formed of a light source 10 and a reflector 11.

The light source 10 outputs white light L. The light source 10 in the present embodiment is formed, for example, of a light emitting diode (LED). The projector 100 according to the present embodiment uses an LED as the light source 10 to reduce the size and weight of the light source unit 1.

The reflector 11 is provided at the light exiting side of the light source 10. The reflector 11 reflects the white light L output from the light source 10 at a large angle of radiation to cause the white light L to enter the image generator 2.

The image generator 2 includes a first Fresnel lens 21, one light modulator 22, and a second Fresnel lens 23.

The first Fresnel lens 21 is disposed at the light incident side of the light modulator 22, parallelizes the white light L output from the light source unit 1, and causes the parallelized white light L to enter the light modulator 22. The first Fresnel lens 21 functions as a convex lens having positive power.

The image generator 2 in the present embodiment uses the first Fresnel lens 21 as the parallelizing lens to reduce the dimension of the projector 100 in the rightward-leftward direction X along the first optical axis AX1.

The light modulator 22 is formed of a transmissive liquid crystal panel 220. The liquid crystal panel 220 includes a color filter and modulates the white light L from the light source 10 in accordance with image information to generate full-color image light LT. The light modulator 22 further includes a light-incident-side polarizer 221 provided at the light incident side of the liquid crystal panel 220 and a light-exiting-side polarizer 222 provided at the light exiting side of the liquid crystal panel 220. The light-incident-side polarizer 221 and the light-exiting-side polarizer 222 are so arranged that the polarization axes thereof are perpendicular to each other.

The projector 100 according to the present embodiment employs a single-panel scheme using the single liquid crystal panel 220 to reduce the size of the configuration of the projector 100.

The second Fresnel lens 23 is disposed at the light exiting side of the light modulator 22. The second Fresnel lens 23 functions as a convex lens having positive power, and causes the image light LT output from the light-exiting-side polarizer 222 of the liquid crystal panel 220 to converge.

The image generator 2 in the present embodiment uses the second Fresnel lens 23 as the lens that causes light to converge to reduce the dimension of the projector 100 in the rightward-leftward direction X along the first optical axis AX1.

In the projector 100 according to the present embodiment, the pixel shifting device 4 is disposed between the image generator 2 and the projection system 3. The pixel shifting device 4 includes an optical path changer 40, which changes the optical path of the image light LT output from the liquid crystal panel 220 of the image generator 2, and can successively shift the optical path of the image light LT between a reference position and a shifted position.

The pixel shifting device 4 performing no pixel shifting is so disposed in the inner enclosure 6 that the light incident surface of the optical path changer 40 intersects at an angle of 45° with the first optical axis AX1 and the second optical axis AX2. The optical path changer 40 deflects the optical path of the image light LT output from the image generator 2 by 90° and causes the image light LT to enter the projection system 3.

The projector 100 according to the present embodiment can display an image having a resolution higher than that of the liquid crystal panel 220 on the screen SCR, which is the projection receiving surface, by shifting the optical path of the image light LT with the aid of the pixel shifting device 4. The configuration of the pixel shifting device 4 will be described later in detail.

The fan 5 cools at least the pixel shifting device 4. The fan 5 is disposed at the opposite side of the optical path changer 40 of the pixel shifting device 4 from the side toward which the optical path changer 40 outputs the light.

The pixel shifting device 4 generates heat when driven and therefore forms a heat source in the inner enclosure 6. In the projector 100 according to the present embodiment, an increase in the temperature of the pixel shifting device 4 can be suppressed by using the space at the opposite side of the optical path changer 40 from the side toward which the optical path changer 40 outputs the light to cool the pixel shifting device 4. Furthermore, since the fan 5 is not located at the light incident side of the optical path changer 40, the fan 5 can cool the optical path changer 40 without blocking the image light LT.

Note that the light source unit 1, the image generator 2, and the projection system 3 may be cooled by supplying part of the airflow from the fan 5.

Figure 2:
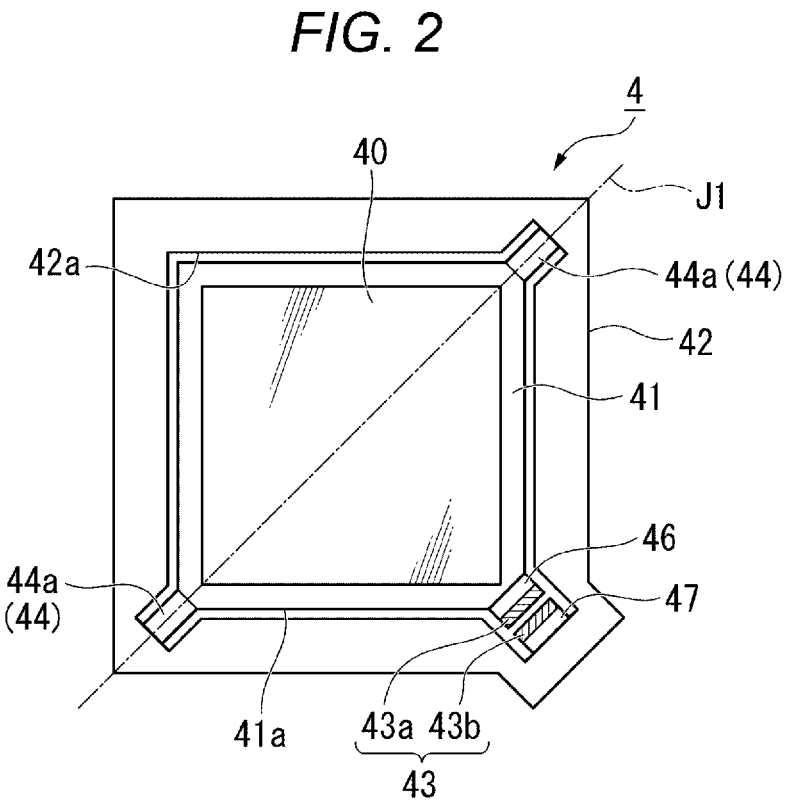
FIG. 2 is a plan view of a pixel shifting device.

The configuration of the pixel shifting device 4 will be subsequently described. FIG. 2 is a plan view of the pixel shifting device 4.

The pixel shifting device 4 includes the optical path changer 40, a first movable section 41, which holds the optical path changer 40, a base 42, which is linked to the first movable section 41 swingably around a first swing axis J1, a first actuator 43, which swings the first movable section 41, and a linkage shaft section 44, as shown in FIG. 2. The pixel shifting device 4 in the present embodiment can shift the optical path of the image light LT by changing the posture of the optical path changer 40.

The optical path changer 40 is an element that changes the optical path of the image light LT by reflecting the image light LT. The optical path changer 40 is formed of a light transmissive substrate 40a having a surface at which a reflective film 40b is formed. The reflective film 40b is formed at a rear surface 40a2 at the opposite side of the light transmissive substrate 40a from a light incident surface 40a1. The surface of the reflective film 40b where the reflective film 40b is in contact with the light transmissive substrate 40*a* functions as a reflection surface 40*c* of the optical path changer 40. That is, the optical path changer 40 has the reflection surface 40*c*, which reflects the image light LT.

The light incident on the optical path changer 40 is refracted at the light incident surface 40*al* of the light transmissive substrate 40*a*, passes through the light transmissive substrate 40*a*, is reflected off the reflective film 40*b*, and is refracted again when exiting out of the light transmissive substrate 40*a*. The optical path changer 40 shifts the optical path of the image light LT in accordance with the posture of the optical path changer 40 when deflecting the optical path of the image light LT incident from the image generator 2 by 90°. The amount of shift of the optical path of the image light LT is specified in accordance with the degree of the change in the posture of the optical path changer 40.

The light transmissive substrate 40*a* is formed, for example, of a substantially square white glass plate. Employing a white glass plate having excellent strength increases the rigidity of the optical path changer 40 as a whole and can therefore suppress possible distortion of the optical path changer 40. The reflective film is formed, for example, of a metal film or a dielectric multilayer film.

Note that the material of the light transmissive substrate 40*a* is not limited to white plate glass, and may be any material having optical transparency and capable of refracting light, such as borosilicate glass, quartz glass, and a variety of other glass materials. The material of the light transmissive substrate 40*a* may instead be any of a variety of crystal materials, such as crystal quartz and sapphire, or any of a variety of resin materials, such as polycarbonate-based resin and acrylic resin. The optical path changer 40 does not necessarily have a substantially square shape, and may have a rectangular, rhombic, or elliptical shape.

The first movable section 41 is a frame-shaped holding frame made of metal, and is disposed around the optical path changer 40. The first movable section 41 supports the outer circumferential edge of the optical path changer 40 to accommodate the optical path changer 40 with the front and rear surfaces thereof exposed. The first movable section 41 is made, for example, of stainless steel. The optical path changer 40 is fixed to the first movable section 41 with an adhesive. Note that the first movable section 41 is not limited to a frame-shaped section, and may be any member that supports at least part of the optical path changer 40.

The base 42 is a frame-shaped support member that is made of resin, is one size larger than the first movable section 41, and is disposed around the first movable section 41. The base 42 has a base inner side surface 42*a*, which is a frame-shaped side surface and surrounds an outer side surface 41*a* of the first movable section 41. The base 42 is fixed to the inner enclosure 6.

The linkage shaft section 44 is formed of a pair of shaft sections 44*a*, which swingably link the outer side surface 41*a* of the first movable section 41 to the base inner side surface 42*a* of the base 42.

The pair of shaft sections 44*a* are provided so as to protrude from a pair of corner portions that form the outer side surface 41*a* of the first movable section 41, which has a rectangular frame shape, and are located on a diagonal line of the rectangular frame shape, and the pair of shaft sections 44*a* link the outer side surface 41*a* of the first movable section 41 to the base inner side surface 42*a* of the base 42.

The pair of shaft sections 44*a* are linked to portions that form the base inner side surface 42*a*, which has a rectangular frame shape, and are located on one diagonal line of the rectangular frame shape. The first swing axis J1 of the first movable section 41 is an imaginary axis extending along the pair of shaft sections 44*a*, and the first swing axis J1 passes through the center of the optical path changer 40 supported by the first movable section 41.

The first movable section 41, which holds the optical path changer 40, has diagonal portions located on the diagonal line perpendicular to the first swing axis J1 and swingable around the first swing axis J1 because the pair of shaft sections 44*a* located at opposite ends of the first movable section 41 in the direction along the first swing axis J1 are fixed to the base 42.

The optical path changer 40 is therefore rotatable along with the first movable section 41 relative to the base 42 around the first swing axis J1, so that the posture of the optical path changer 40 can be changed.

The first actuator 43 includes a first magnet 43*a*, which is disposed at the outer side surface 41*a* of the first movable section 41, and a first coil 43*b*, which is disposed at the base inner side surface 42*a* of the base 42 and faces the first magnet 43*a*, in a direction intersecting with the first swing axis J1.

Specifically, the first magnet 43*a* is provided at one corner portion that forms the outer side surface 41*a* of the first movable section 41 and is located on the other diagonal line where the shaft sections 44*a* are not provided. The first coil 43*b* is located at a portion that forms the base inner side surface 42*a*, is located on the diagonal line perpendicular to the first swing axis J1, and faces the first magnet 43*a*.

As described above, the first magnet 43*a* and the first coil 43*b*, which constitute the first actuator 43, are disposed at portions that form the outer side surface 41*a* of the first movable section 41 and the base inner side surface 42*a* of the base 42 and are located at one end of the diagonal line perpendicular to the first swing axis J1.

The first magnet 43*a* is disposed at the outer side surface 41*a* of the first movable section 41 via a magnet frame 46. The magnet frame 46 is made of metal, such as iron, and functions as a back yoke. The first magnet 43*a* may be a neodymium magnet or a permanent magnet producing a predetermined magnetic force, such as a samarium-cobalt magnet, a ferrite magnet, and an alnico magnet.

The first coil 43*b* is disposed at the base inner side surface 42*a* of the base 42 via a coil frame 47. The coil frame 47 is so fixed to the base inner side surface 42*a* that the first coil 43*b* faces the first magnet 43*a* with a gap therebetween. The coil frame 47 is made of metal, such as iron, and functions as a back yoke. The first coil 43*b* is formed of a coil wire wound around the coil frame 47.

Note that the positions of the first magnet 43*a* and the first coil 43*b* may be swapped, that is, the first magnet 43*a* may be disposed at the base inner side surface 42*a* of the base 42, and the first coil 43*b* may be disposed at the outer side surface 41*a* of the first movable section 41. That is, the first magnet 43*a* only needs to be disposed at one of the outer side surface 41*a* of the first movable section 41 and the base inner side surface 42*a* of the base 42, and the first coil 43*b* only needs to be disposed at the other one of the outer side surface 41*a* of the first movable section 41 and the base inner side surface 42*a* of the base 42.

The first actuator 43 produces a force acting between the first magnet 43*a* and the first coil 43*b* in a direction that intersects with the first swing axis J1 by energizing the first coil 43*b* to produce a magnetic field that causes the first coil 43*b* and the first magnet 43*a* to repel or attract each other. Since the pair of shaft sections 44*a*, which are located at opposite ends of the first movable section 41 in the direction along the first swing axis J1, are fixed to the base 42 as described above, the portion of the first movable section 41 that is provided with the first magnet 43a swings around the first swing axis J1. The optical path changer 40 fixed to the first movable section 41 therefore swings relative to the base 42 around the first swing axis J1.

Based on the configuration described above, the pixel shifting device 4 in the present embodiment can swing the first movable section 41 around the first swing axis J1 by adjusting the amount of electric power supplied to the first coil 43b to control the posture of the optical path changer 40.

The pixel shifting device 4 can deflect the optical path of the image light LT output from the liquid crystal panel 220 of the image generator 2 by 90° and shift the optical path of the image light LT in the direction perpendicular to the first swing axis J1 by changing the posture of the optical path changer 40.

Since the pixel shifting device 4 in the present embodiment employs the configuration in which the first movable section 41 and the base 42 are disposed around the optical path changer 40, the dimension of the optical path changer 40 in the thickness direction can be reduced.

The projection system 3 enlarges the image light LT output from the liquid crystal panel 220 of the image generator 2 and projects the enlarged image light LT onto the screen SCR, which is the projection surface. An enlarged color image is thus displayed on the screen SCR. The image displayed on the screen SCR is the image of a pixel region GA of the liquid crystal panel 220.

Figure 3:
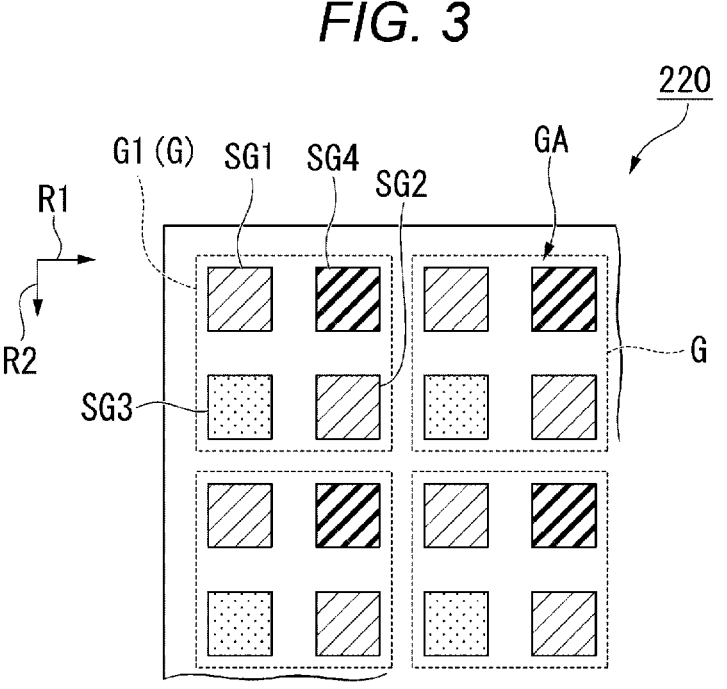
FIG. 3 is a plan view showing key portions of the structure of the pixels of a liquid crystal panel.

The structure of the pixels of the liquid crystal panel 220 will now be described. FIG. 3 is a plan view showing key portions of the structure of the pixels of the liquid crystal panel 220.

The liquid crystal panel 220 has the pixel region GA including a plurality of pixels G, as shown in FIG. 3. In the pixel region GA, the plurality of pixels G are arranged in a matrix in a row direction R1 and a column direction R2 perpendicular to each other. In the pixel region GA, one pixel G is formed of a plurality of sub-pixels segmented by a black matrix BM. The black matrix BM is wiring lines that are disposed between the sub-pixels and drive the sub-pixels, or a light shielding member that covers the wiring lines and segments the sub-pixels. The sub-pixels are provided with color filters corresponding to light having different colors.

The pixels G in the pixel region GA are each formed of four sub-pixels SG1, SG2, SG3, and SG4, which are diagonally disposed and form two sub-pixel pairs that intersect with each other. Specifically, the sub-pixels SG1 and SG2 are disposed on one diagonal line of the pixel G, which has a substantially square shape, and the sub-pixels SG3 and SG4 are disposed on the other diagonal line of the pixel G. The sub-pixels SG1 and SG3 are sequentially arranged in the column direction R2, and the sub-pixels SG4 and SG2 are sequentially arranged in the column direction R2. In the present embodiment, the sub-pixels SG1 and SG2 generate green image light LT, the sub-pixel SG3 generates red image light LT, and the sub-pixel SG4 generates blue image light LT.

In the liquid crystal panel 220 in the present embodiment, the plurality of pixels G include a first pixel G1. The first pixel G1 is located in the first row and in the first column among the plurality of pixels G in the pixel region GA.

An image displayed on the screen SCR by the image light output from the liquid crystal panel 220 having the configuration shown in FIG. 3 has a pixel structure corresponding to the pixel region GA of the liquid crystal panel 220.

Specifically, the image displayed on the screen SCR is formed of a plurality of pixels, which are each formed of four sub-pixels.

In general, the resolution of an image displayed by a projector on a screen depends on the number of pixels of a liquid crystal panel, which is a light modulator. In related art, a single-panel projector using a single liquid crystal panel has advantages of compactness, lightweight, and excellent portability, but has a problem of a difficulty in achieving higher resolution than that of a three-panel projector using three liquid crystal panels.

In contrast, the projector 100 according to the present embodiment can display a high-resolution image on the screen SCR by shifting the optical path of the image light LT with the aid of the pixel shifting device 4, while still having the advantages provided by the single panel scheme.

Figure 4:
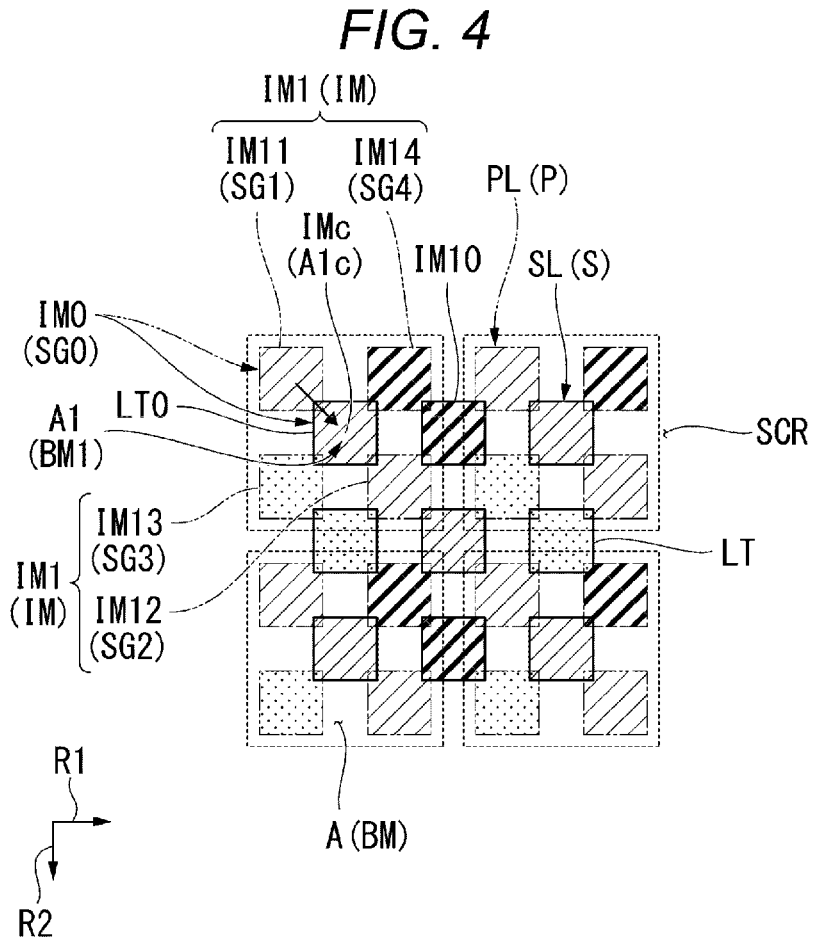
FIG. 4 describes the principle of an increase in the resolution of an image.

The principle of an increase in the resolution of an image achieved by the pixel shifting device 4 will be described below. FIG. 4 describes the principle of the increase in the resolution of an image. FIG. 4 shows key portions of an image displayed on the screen SCR.

In the present specification, the optical path of the image light LT output from the optical path changer 40 in the case where the pixel shifting device 4 does not perform the pixel shifting is referred to as a reference optical path, and the optical path of the image light LT output from the optical path changer 40 in the case where the pixel shifting device 4 performs the pixel shifting is referred to as a shifted optical path.

Furthermore, the position where the image light LT traveling along the reference optical path displays an image on the screen SCR is referred to as a "reference display position", and the position where the image light LT traveling along the shifted optical path displays an image on the screen SCR is referred to as a "shifted display position". In FIG. 4, the reference optical path is labeled with a reference character PL, the shifted optical path is labeled with a reference character SL, the reference display position is labeled with a reference character P, and the shifted display position is labeled with a reference character S. An image displayed on the screen SCR by the image light LT output from the liquid crystal panel 220 is referred to as a "displayed image", and the displayed image is labeled with a reference character IM in FIG. 4.

When the pixel shifting device 4 swings the optical path changer 40 around the first swing axis J1, as shown in FIG. 2, the optical path of the image light LT output from each of the pixels G of the liquid crystal panel 220 is shifted. At this point of time, the optical path of the image light LT output from each of the pixels G of the liquid crystal panel 220 is shifted from the reference optical path PL to the shifted optical path SL or vice versa, and the position where the displayed image IM is displayed on the screen SCR is switched between the reference display position P and the shifted display position S, as shown in FIG. 4.

The pixel shifting device 4 in the present embodiment positions the image light LT traveling along the reference optical path at the reference display position P on the screen SCR when the pixel shifting is not performed, and positions the image light LT traveling along the shifted optical path at the shifted display position S on the screen SCR when the pixel shifting is performed, as shown in FIG. 4.

The displayed image IM on the screen SCR has the same pixel structure as that of the pixel region GA of the liquid crystal panel 220, as described above. The displayed image IM therefore includes a plurality of pixels, which are each formed of four sub-pixels.

Hereinafter, the pixels of the displayed image IM on the screen SCR are each referred to as a "displayed pixel", and the plurality of sub-pixels, which constitute displayed pixel, are referred to as "displayed sub-pixels".

In FIG. 4, out of the plurality of displayed pixels, which constitute the displayed image IM on the screen SCR, the displayed pixel corresponding to the first pixel G1 of the liquid crystal panel 220 shown in FIG. 3 is referred to as a first displayed pixel IM1. Note that FIG. 4 shows only the first displayed pixel IM1 and the pixels therearound out of the plurality of displayed pixels, which constitute the displayed image IM, for clarity of FIG. 4.

In FIG. 4, the displayed sub-pixels corresponding to the four sub-pixels SG1, SG2, SG3, and SG4, which constitute the first pixel G1 of the liquid crystal panel 220, are referred to as first displayed sub-pixels IM11, IM12, IM13, and IM14, respectively. The sub-pixels can be formed of the sub-pixel SG1 for green light, the sub-pixel SG2 for green light, the sub-pixel SG3 for red light, and the sub-pixel SG4 for blue light.

In the present embodiment, the sub-pixel SG1, which is one of the four sub-pixels SG1, SG2, SG3, and SG4, which constitute the first pixel G1 shown in FIG. 3, is referred to as a reference sub-pixel SG0. Among the first displayed sub-pixels IM11, IM12, IM13, and IM14 of the displayed image IM, the first displayed sub-pixel IM11 corresponding to the reference sub-pixel SG0 is referred to as a reference displayed sub-pixel IM0.

The pixel shifting device 4 in the present embodiment shifts the optical path of image light LT0 output from the reference sub-pixel SG0 in one direction with respect to the reference optical path PL as the shifted optical path SL.

Specifically, the pixel shifting device 4 superimposes the image light LT0 output from the reference sub-pixel SG0 at the shifted display position S on the region corresponding to the black matrix BM at the reference display position P.

The optical path of the image light LT0 output from the reference sub-pixel SG0 will be described below, and the same applies to the optical paths of the image light LT output from the other sub-pixels.

The region corresponding to the black matrix BM at the reference display position P is a region located between the displayed sub-pixels in the displayed image IM, and corresponds to a non-display section A, where no image is displayed.

That is, the pixel shifting device 4 in the present embodiment superimposes the reference displayed sub-pixel IM0 of the displayed image IM at the shifted display position S on the non-display section A of the displayed image IM at the reference display position P.

More specifically, the pixel shifting device 4 in the present embodiment superimposes the image light LT0 output from the reference sub-pixel SG0 at the shifted display position S on the region corresponding to an intersection BM1 of the black matrix BM and surrounded by four corners of the four sub-pixels SG1, SG2, SG3 and SG4, which constitute the first pixel G1, at the reference display position P. Note that the intersection BM1 of the black matrix BM corresponds to "a first portion of the black matrix".

That is, the pixel shifting device 4 in the present embodiment superimposes the reference displayed sub-pixel IM0 of the displayed image IM at the shifted display position S on an intersection A1 of the non-display section A, which is surrounded by four corners of the first displayed sub-pixels IM11, IM12, IM13, and IM14 of the first displayed pixel IM1 at the reference display position P. During the pixel shifting, the pixel shifting device 4 shifts the optical path of the image light LT by a pixel interval of 0.5 at which the displayed sub-pixels are arranged in the diagonal directions.

As described above, the pixel shifting device 4 in the present embodiment can efficiently superimpose displayed sub-pixels IM10, which constitute each of the displayed pixels of the displayed image IM after the pixel shifting, on the non-display section A of the displayed image IM before the pixel shifting. The pixel shifting device 4 can therefore increase the apparent number of pixels by disposing pixels in a pseudo manner in the non-display section A of the displayed image IM on the screen SCR to increase the resolution of the displayed image IM.

In the present embodiment, the optical axis of the image light LT0 output from the reference sub-pixel SG0 at the shifted display position S is located at the center of the region corresponding to the intersection BM1 of the black matrix BM at the reference display position P. That is, a center IMc of the reference displayed sub-pixel IM0 of the displayed image IM is located at a center A1c of the intersection A1 of the non-display section A.

In this case, the reference displayed sub-pixel IM0 at the shifted display position S overlaps by the same degree with the four displayed sub-pixels IM11, IM12, IM13, and IM14 at the reference display position P.

Since the total amount of overlap of the displayed sub-pixels after the pixel shifting with the four displayed sub-pixels before the pixel shifting is therefore small, color mixture in the displayed image IM due to the overlap between the displayed sub-pixels before and after the pixel shifting is suppressed, so that the appearance of the displayed image IM having higher resolution achieved by the pixel shifting can be further improved.

As described above, the projector 100 according to the present embodiment includes the light source 10, the single light modulator 22, which has the pixel region GA containing the plurality of pixels G and modulates the light output from the light source 10 to generate the image light LT, the pixel shifting device 4, which can switch the optical path of the image light LT output from the light modulator 22 between the reference optical path PL and the shifted optical path SL, and the projection system 3, which projects the image light LT incident from the pixel shifting device 4 onto the screen SCR, which is a projection receiving surface. In the pixel region GA of the light modulator 22, the plurality of sub-pixels, which are segmented by the black matrix BM and output light having different colors, constitutes one pixel G, and the pixel shifting device 4 positions the image light LT traveling along the reference optical path PL at the reference display position P on the screen SCR, and positions the image light LT traveling along the shifted optical path SL at the shifted display position S on the screen SCR to superimpose the image light LT output from the sub-pixels at the shifted display position S on the region corresponding to the black matrix BM at the reference display position P.

In the projector 100 according to the present embodiment, the pixel shifting device 4 can shift the optical path of the image light LT to switch the image display position on the screen SCR between the reference display position P and the shifted display position S, so that the apparent number of pixels of the displayed image IM on the screen SCR and hence the resolution of the displayed image IM can be increased.

Furthermore, the projector 100 according to the present embodiment allows the image light LT to be incident on the non-display section A of the displayed image IM, which is the region corresponding to the black matrix BM of the liquid crystal panel 220 and where no image is normally displayed. The non-display section A, which is the portion corresponding to the black matrix of the displayed image IM, is therefore unlikely to be noticeable.

Moreover, the projector 100 according to the present embodiment, in which the compact, lightweight pixel shifting device 4 is combined with the single-panel image generator 2 using the single liquid crystal panel 220 as the light modulator 22, can be a compact, lightweight projector that excels in portability and can display a high-resolution image.

Second Embodiment

The projector according to a second embodiment will be subsequently described. The present embodiment differs from the first embodiment in that the pixel shifting device has two swing axes. The following description will therefore be given to the configuration of the pixel shifting device, and the members common to those in the embodiment described above have the same reference characters and will not be described in detail.

Figure 5:
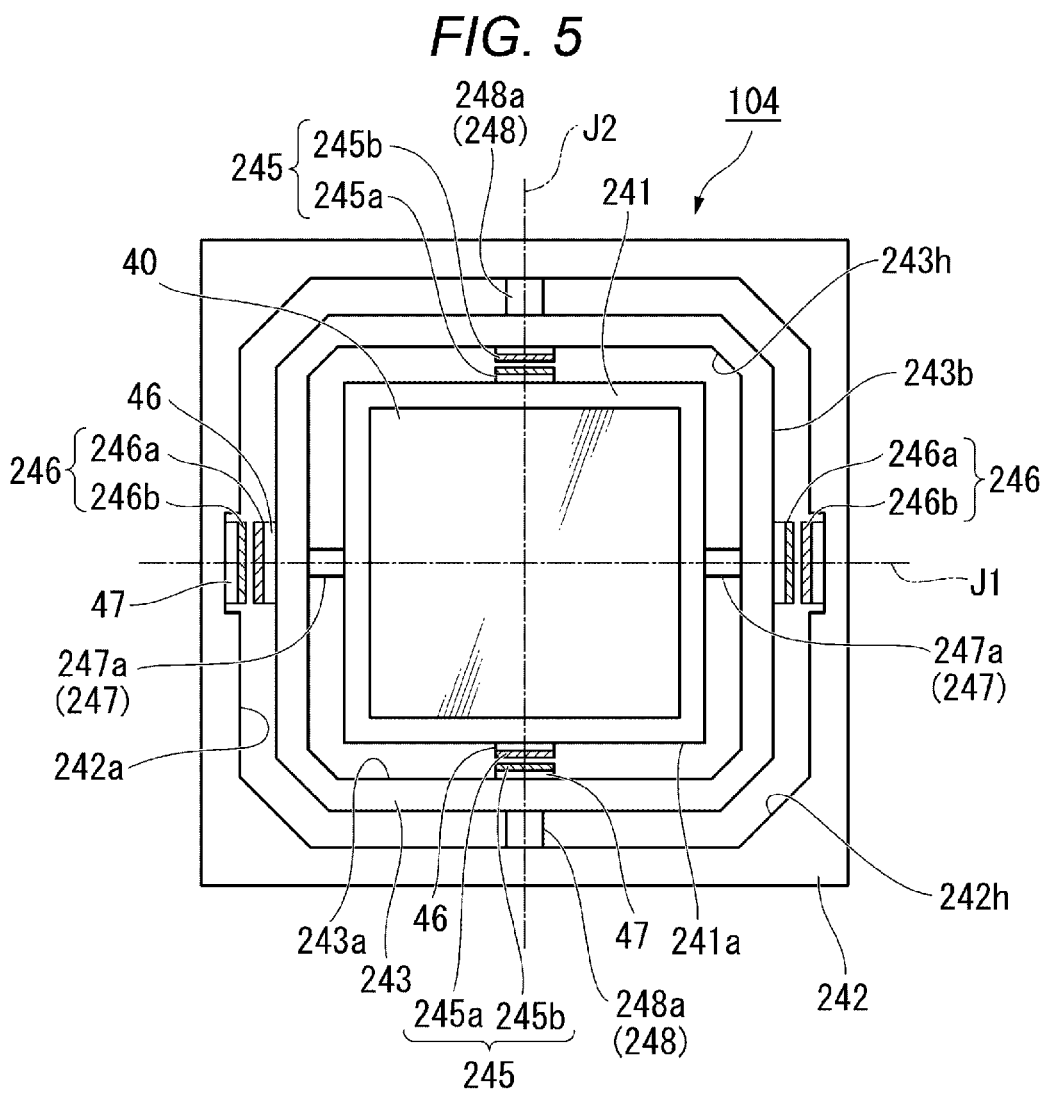
FIG. 5 is a plan view of the pixel shifting device in a second embodiment.

FIG. 5 is a plan view of the pixel shifting device in the present embodiment.

A pixel shifting device 104 in the present embodiment includes the optical path changer 40, a first movable section 241, which holds the optical path changer 40, a second movable section 243, which is linked to the first movable section 241 swingably around the first swing axis J1, a base 242, which is linked to the second movable section 243 swingably around a second swing axis J2, a pair of first actuators 245, which swing the first movable section 241 around the first swing axis J1, a pair of second actuators 246, which swing the second movable section 243 around the second swing axis J2, a first linkage section 247, and a second linkage section 248, as shown in FIG. 5.

The first swing axis J1 is an imaginary axis around which the first movable section 241 swings relative to the second movable section 243, and the second swing axis J2 is an imaginary axis around which the second movable section 243 swings relative to the base 242. That is, the pixel shifting device 104 in the present embodiment employs a two-axis swing scheme.

The first movable section 241 is disposed around the optical path changer 40. The first movable section 241 is formed of a rectangular-frame-shaped member, and supports the optical path changer 40 therein.

The first linkage section 247 is formed of a pair of first shaft sections 247a, which each swingably link an outer side surface 241a of the first movable section 241 to an inner side surface 243a of the second movable section 243. The pair of first shaft sections 247a protrude from the outer side surfaces opposite from each other out of the four outer side surfaces 241a of the first movable section 241, and link the first movable section 241 to the second movable section 243.

The first swing axis J1 of the first movable section 241 is an imaginary axis extending along the pair of first shaft sections 247a, and the first swing axis J1 passes through the center of the optical path changer 40 supported by the first movable section 241. The first movable section 241 is therefore rotatable relative to the second movable section 243 around the first swing axis J1. The optical path changer 40 supported by the first movable section 241 is therefore rotatable relative to the second movable section 243 around the first swing axis J1, so that the posture of the optical path changer 40 can be changed.

The second movable section 243 is formed of a substantially octagonal plate in the plan view, and has a substantially octagonal opening 243h. The first movable section 241, which supports the optical path changer 40, is disposed in the opening 243h of the second movable section 243. That is, the second movable section 243 is formed of a frame-shaped member that surrounds the first movable section 241 and disposed around the first movable section 241.

The second linkage section 248 is formed of a pair of second shaft sections 248a, which each swingably link an outer side surface 243b of the second movable section 243 to a base inner side surface 242a of the base 242. The pair of second shaft sections 248a protrude from the outer side surfaces opposite from each other out of the eight outer side surfaces 241a of the second movable section 243, and link the second movable section 243 to the base 242.

The base 242 is formed, for example, of a metal plate, and has a substantially octagonal opening 242h in the plan view, and the second movable section 243 is disposed in the opening 242h. That is, the base 242 is disposed in the form of a frame around the second movable section 243. The base 242 has the base inner side surfaces 242a, which face the outer side surfaces 243b of the second movable section 243.

The second swing axis J2 of the second movable section 243 is an imaginary axis extending along the pair of second shaft sections 248a, and the second swing axis J2 is perpendicular to the first swing axis J1 and passes through the center of the optical path changer 40 supported by the first movable section 241. The second movable section 243 is therefore rotatable relative to the base 242 around the second swing axis J2. The optical path changer 40 supported by the second movable section 243 via the first movable section 241 is therefore rotatable relative to the base 242 around the second swing axis J2, so that the posture of the optical path changer 40 can be changed.

The pair of first actuators 245 are provided at portions of the opening 243h of the second movable section 243 that face each other along the second swing axis J2, which intersects with the first swing axis J1. The first actuators 245 each include a magnet and a coil disposed with a predetermined distance therebetween in the direction along the second swing axis J2. Specifically, the first actuators 245 each include a first magnet 245a disposed at the outer side surface 241a of the first movable section 241, and a first coil 245b disposed at the inner side surface 243a of the second movable section 243 and facing the first magnet 245a, the first magnet 245a and the first coil 245b being arranged in the direction along the second swing axis J2, which intersects with the first swing axis J1. Note that the first magnet 245a and the first coil 245b have the same configurations as those of the first magnet 43a and the first coil 43b, which constitute the first actuator 43 in the first embodiment, so that no description of the first magnet 245a and the first coil 245b will be made.

The first magnet 245a is disposed at the outer side surface 241a of the first movable section 241 via the magnet frame 46, which functions as a back yoke. The first coil 245b is disposed at the inner side surface 243a of the second movable section 243 via the coil frame 47, which functions as a back yoke.

Note that the positions of the first magnet 245a and the first coil 245b may be swapped, that is, the first magnet 245a may be disposed at the inner side surface 243a of the second movable section 243, the first coil 245b may be disposed at the outer side surface 241a of the first movable section 241. That is, the first magnet 245a only needs to be disposed at one of the outer side surface 241a of the first movable section 241 and the inner side surface 243*a* of the second movable section 243, and the first coil 245*b* only needs to be disposed at the other one of the outer side surface 241*a* of the first movable section 241 and the inner side surface 243*a* of the second movable section 243.

The pair of second actuators 246 are provided at portions of the opening 242*h* of the base 242 that face each other along the first swing axis J1, which intersects with the second swing axis J2. The second actuators 246 each include a magnet and a coil disposed with a predetermined distance therebetween in the direction along the first swing axis J1. Specifically, the second actuators 246 each include a second magnet 246*a* disposed at the outer side surface 243*b* of the second movable section 243, and a second coil 246*b* disposed at the base inner side surface 242*a* of the base 242 and facing the second magnet 246*a*, the second magnet 246*a* and the second coil 246*b* being arranged in the direction along the first swing axis J1, which intersects with the second swing axis J2. Note that the second magnet 246*a* and the second coil 246*b* have the same configurations as those of the first magnet 245*a* and the first coil 245*b*, which constitute each of the first actuators 245, so that no description of the second magnet 246*a* and the second coil 246*b* will be made.

The second magnet 246*a* is disposed at the outer side surface 243*b* of the second movable section 243 via the magnet frame 46, which functions as a back yoke. The second coil 246*b* is disposed at the base inner side surface 242*a* of the base 242 via the coil frame 47, which functions as a back yoke. Note in present embodiment that the second coil 246*b* is provided in a portion that forms the base inner side surface 242*a* and is recessed with respect to the other portions thereof.

The positions of the second magnet 246*a* and the second coil 246*b* may be swapped, that is, the second magnet 246*a* may be disposed at the base inner side surface 242*a* of the base 242, and the second coil 246*b* may be disposed at the outer side surface 243*b* of the second movable section 243. That is, the second magnet 246*a* only needs to be disposed at one of the outer side surface 243*b* of the second movable section 243 and the base inner side surface 242*a* of the base 242, and the second coil 246*b* only needs to be disposed at the other one of the outer side surface 243*b* of the second movable section 243 and the base inner side surface 242*a* of the base 242.

The first actuators 245 each produce a force acting between the first magnet 245*a* and the first coil 245*b* in a direction that intersects with the first swing axis J1 by energizing the first coil 245*b* to produce a magnetic field that causes the first coil 245*b* and the first magnet 245*a* to repel or attract each other. The first movable section 241 thus swings around the first swing axis J1. In the first movable section 241, the first shaft sections 247*a* located at opposite ends in the direction along the first swing axis J1 are linked to the second movable section 243 as described above, the optical path changer 40 fixed to the first movable section 241 can swing relative to the second movable section 243 around the first swing axis J1.

The second actuators 246 each produce a force acting between the second magnet 246*a* and the second coil 246*b* in a direction that intersects with the second swing axis J2 by energizing the second coil 246*b* to produce a magnetic field that causes the second coil 246*b* and the second magnet 246*a* to repel or attract each other. The second movable section 243 thus swings around the second swing axis J2. In the second movable section 243, the second shaft sections 248*a* located at opposite ends in the direction along the second swing axis J2 are linked to the base 242 as described above, the optical path changer 40 fixed to the first movable section 241 and the second movable section 243 via the first linkage section 247 can swing relative to the base 242 around the second swing axis J2.

Based on the configuration described above, the pixel shifting device 104 in the present embodiment can biaxially control the posture of the optical path changer 40, which is supported by the first movable section 241, via the first actuator 245 and the second actuator 246. The pixel shifting device 104 can therefore deflect the optical path of the image light LT output from the liquid crystal panel 220 of the image generator 2 by 90° and shift the optical path of the image light LT in the directions along the two axes by changing the posture of the optical path changer 40.

Since the pixel shifting device 104 in the present embodiment employs the configuration in which the first movable section 241, the second movable section 243, and the base 242 are disposed around the optical path changer 40, the dimension of the optical path changer 40 in the thickness direction can be reduced.

Figure 6:
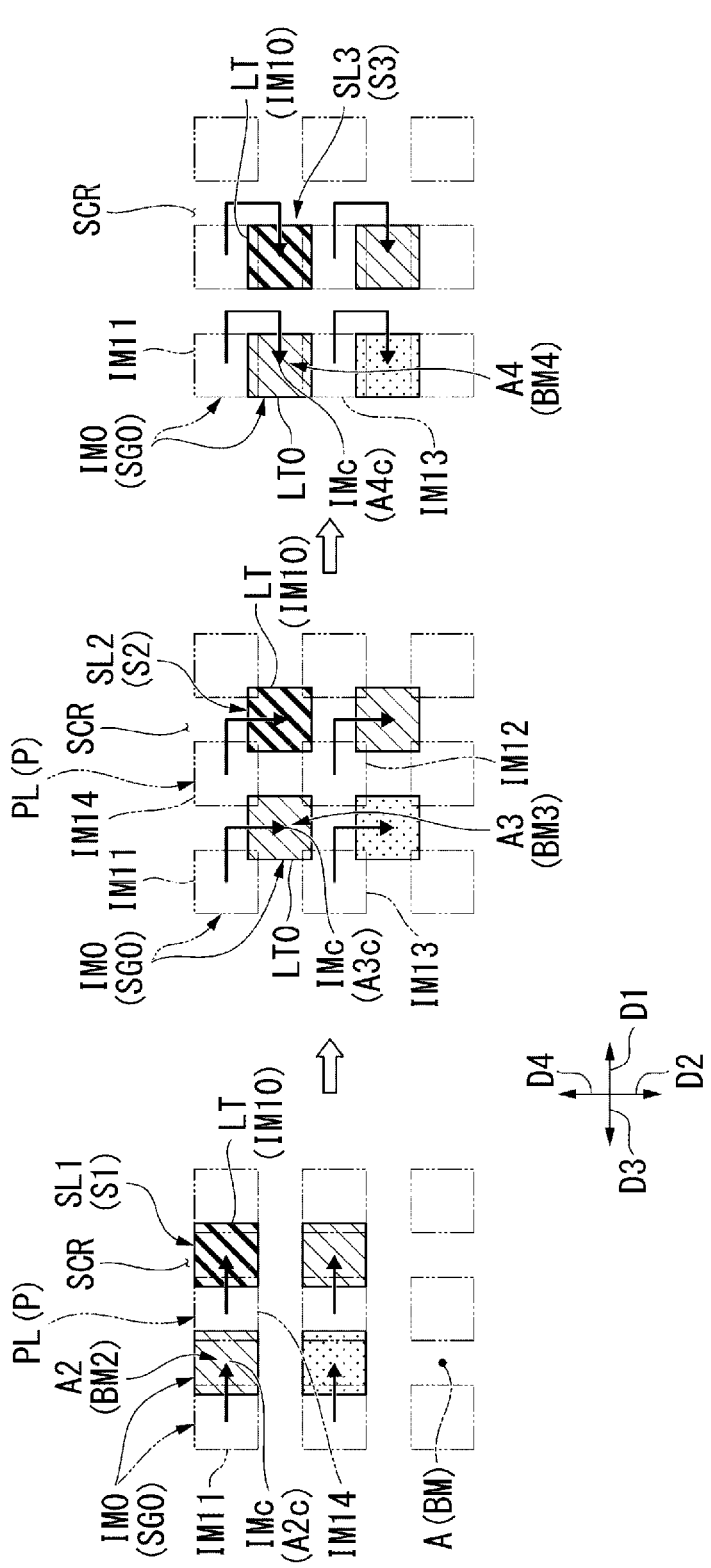
FIG. 6 describes the principle of an increase in the resolution of an image.

The principle of an increase in the resolution of an image achieved by the pixel shifting device 104 in the present embodiment will be subsequently described. FIG. 6 describes the principle of the increase in the resolution of an image. FIG. 6 shows key portions of an image displayed on the screen SCR.

In the displayed image IM in FIG. 6, the direction in which the first displayed sub-pixels IM11 and IM14 of the first displayed pixel IM1 are sequentially arranged is referred to as a first direction D1, the direction in which the first displayed sub-pixels IM14 and IM12 of the first displayed pixel IM1 are sequentially arranged is referred to as a second direction D2, the direction which is opposite of the first direction D1 and in which the first displayed sub-pixels IM12 and IM13 are sequentially arranged is referred to as a third direction D3, and the direction which is opposite of the second direction D2 and in which the first displayed sub-pixels IM13 and IM11 are sequentially arranged is referred to as a fourth direction D4.

FIG. 6 shows only part of the plurality of displayed pixels that constitute the displayed image IM, the first displayed pixel IM1 and the displayed pixels located around the first displayed pixel IM1, for clarity of FIG. 6.

The pixel shifting device 104 in the present embodiment switches the optical path of the image light LT among the reference optical path PL, a first shifted optical path SL1, a second shifted optical path SL2, and a third shifted optical path SL3 by changing the posture of the optical path changer 40.

The first shifted optical path SL1 is an optical path as a result of shifting the optical path of the image light LT output from the reference sub-pixel SG0 relative to the reference optical path PL in the first direction D1 on the screen SCR.

The second shifted optical path SL2 is an optical path as a result of shifting the optical path of the image light LT output from the reference sub-pixel SG0 relative to the first shifted optical path SL1 in the second direction D2 different from the first direction D1 on the screen SCR.

The third shifted optical path SL3 is an optical path as a result of shifting the optical path of the image light LT output from the reference sub-pixel SG0 relative to the second shifted optical path SL2 in the third direction D3 on the screen SCR.

The pixel shifting device 104 in the present embodiment positions the image light LT traveling along the reference optical path PL at the reference display position P on the screen SCR, positions the image light LT traveling along the first shifted optical path SL1 at a first shifted display position S1 on the screen SCR, positions the image light LT traveling along the second shifted optical path SL2 at a second shifted display position S2 on the screen SCR, and positions the image light LT traveling along the third shifted optical path SL3 at a third shifted display position S3 on the screen SCR.

In the present embodiment, the pixel shifting device 104 switches the optical path of the image light LT0 output from the reference sub-pixel SG0 from the reference optical path PL to the first shifted optical path SL1 by rotating the second movable section 243 toward one side around the second swing axis J2 to change the posture of the optical path changer 40. At this point of time, the optical path of the image light LT0 output from the reference sub-pixel SG0 shifts in the first direction D1 on the screen SCR, so that the position where the displayed image IM is displayed is switched from the reference display position P to the first shifted display position S1.

The pixel shifting device 104 in the present embodiment superimposes the image light LT0 output from the reference sub-pixel SG0 at the first shifted display position S1 on the region corresponding to a first inter-pixel section BM2 of the black matrix BM and segmenting the two adjacent sub-pixels SG1 and SG4 out of the four sub-pixels SG1, SG2, SG3, and SG4, which constitute the first pixel G1, at the reference display position P. Note that the first inter-pixel section BM2 of the black matrix BM corresponds to "a second portion of the black matrix". To switch the optical path of the image light LT to the first shifted optical path SL1, the pixel shifting device 104 shifts the optical path of the image light LT by the pixel interval of 0.5 at which displayed sub-pixels IM10 are arranged in the first direction D1.

That is, the pixel shifting device 104 in the present embodiment superimposes the reference displayed sub-pixel IM0 of the displayed image IM at the first shifted display position S1 on an inter-pixel section A2 of the non-display section A, which segments the first displayed sub-pixels IM11 and IM14 of the first displayed pixel IM1, at the reference display position P.

In the present embodiment, the optical axis of the image light LT0 output from the reference sub-pixel SG0 at the first shifted display position S1 is located at the center of the region corresponding to the first inter-pixel section BM2 of the black matrix BM at the reference display position P. That is, the center IMc of the reference displayed sub-pixel IM0 of the displayed image IM is located at a center A2c of the inter-pixel section A2 of the non-display section A.

As described above, the pixel shifting device 104 in the present embodiment can efficiently superimpose the four displayed sub-pixels IM11, IM12, IM13, and IM14, which constitute the first displayed pixel IM1, on the inter-pixel section A2 of the non-display section A of the displayed image IM before the pixel shifting. In this case, the reference displayed sub-pixel IM0 at the first shifted display position S1 overlaps by the same degree with the four displayed sub-pixels IM11, IM12, IM13, and IM14 at the reference display position P, so that color mixture in the displayed image IM resulting from the pixel shifting is suppressed, and the appearance of the displayed image IM can therefore be further improved.

The pixel shifting device 104 subsequently switches the optical path of the image light LT0 output from the reference sub-pixel SG0 to the second shifted optical path SL2 by rotating the first movable section 241 around the first swing axis J1 to change the posture of the optical path changer 40.

At this point of time, the optical path of the image light LT0 output from the reference sub-pixel SG0 shifts in the second direction D2 on the screen SCR, so that the position where the displayed image IM is displayed is switched from the first shifted display position S1 to the second shifted display position S2.

The pixel shifting device 104 in the present embodiment shifts the image light LT0 output from the reference sub-pixel SG0 at the second shifted display position S2 from the first shifted optical path SL1 to superimpose the image light LT0 on the region corresponding to an intersection BM3 of the black matrix BM and surrounded by four corners of the four sub-pixels SG1, SG2, SG3 and SG4, which constitute the first pixel G1, at the reference display position P. Note that the intersection BM3 of the black matrix BM corresponds to "a third portion of the black matrix". To switch the optical path of the image light LT to the second shifted optical path SL2, the pixel shifting device 104 shifts the optical path of the image light LT by the pixel interval of 0.5 at which displayed sub-pixels IM10 are arranged in the second direction D2.

That is, the pixel shifting device 104 in the present embodiment superimposes the reference displayed sub-pixel IM0 of the displayed image IM at the second shifted display position S2 on an intersection A3 of the non-display section A, which is surrounded by four corners of the first displayed sub-pixels IM11, IM12, IM13, and IM14 of the first displayed pixel IM1 at the reference display position P.

In the present embodiment, the optical axis of the image light LT0 output from the reference sub-pixel SG0 at the second shifted display position S2 is located at the center of the region corresponding to the intersection BM3 of the black matrix BM at the reference display position P. That is, the center IMc of the reference displayed sub-pixel IM0 of the displayed image IM is located at a center A3c of the intersection A3 of the non-display section A.

As described above, the pixel shifting device 104 in the present embodiment can efficiently superimpose the displayed sub-pixels IM10 of the displayed image IM at the second shifted display position S2 on the intersection of the non-display section A of the displayed image IM before the pixel shifting. The color mixture in the displayed image IM resulting from the pixel shifting is therefore suppressed, so that the appearance of the displayed image IM can be further improved.

The pixel shifting device 104 subsequently switches the optical path of the image light LT0 output from the reference sub-pixel SG0 from the second shifted optical path SL2 to the third shifted optical path SL3 by rotating the second movable section 243 toward the other side around the second swing axis J2 to change the posture of the optical path changer 40. At this point of time, the optical path of the image light LT0 output from the reference sub-pixel SG0 shifts in the third direction D3 on the screen SCR, so that the position where the displayed image IM is displayed is switched from the second shifted display position S2 to the third shifted display position S3.

The pixel shifting device 104 in the present embodiment shifts the image light LT0 output from the reference sub-pixel SG0 from the second shifted optical path SL2 at the third shifted display position S3 to superimpose on the region corresponding to a second inter-pixel section BM4 of the black matrix BM, which differs from the first inter-pixel section BM2 of the black matrix BM, and segmenting the two adjacent sub-pixels SG1 and SG4 out of the four sub-pixels SG1, SG2, SG3, and SG4, which constitute the first pixel G1, at the reference display position P. Note that the second inter-pixel section BM4 of the black matrix BM corresponds to "a fourth portion of the black matrix". To switch the optical path of the image light LT to the third shifted optical path SL3, the pixel shifting device 104 shifts the optical path of the image light LT by the pixel interval of 0.5 at which displayed sub-pixels are arranged in the third direction D3.

That is, the pixel shifting device 104 in the present embodiment superimposes the reference displayed sub-pixel IM0 of the displayed image IM at the third shifted display position S3 on an inter-pixel section A4 of the non-display section A, which segments the first displayed sub-pixels IM11 and IM13 of the first displayed pixel IM1, at the reference display position P.

In the present embodiment, the optical axis of the image light LT0 output from the reference sub-pixel SG0 at the third shifted display position S3 is located at the center of the region corresponding to the second inter-pixel section BM4 of the black matrix BM at the reference display position P. That is, the center IMc of the reference displayed sub-pixel IM0 of the displayed image IM is located at a center A4c of the inter-pixel section A4 of the non-display section A.

As described above, the pixel shifting device 104 in the present embodiment can efficiently superimpose the displayed sub-pixels IM10, which constitute the displayed pixels of the displayed image IM at the third shifted display position S3, on the inter-pixel section of the non-display section A of the displayed image IM before the pixel shifting. The color mixture in the displayed image IM resulting from the pixel shifting is therefore suppressed, so that the appearance of the displayed image IM can be further improved.

Subsequently, the pixel shifting device 104 in the present embodiment switches the optical path of the image light LT0 output from the reference sub-pixel SG0 from the third shifted optical path SL3 to the reference optical path PL. Similarly in the following operation, the pixel shifting device 104 repeatedly shifts the optical path of the image light LT0 output from the reference sub-pixel SG0 sequentially to the reference optical path PL, the first shifted optical path SL1, the second shifted optical path SL2, the third shifted optical path SL3, and the reference optical path PL.

As described above, the projector according to the present embodiment, in which the pixel shifting device 104 controls the posture of the optical path changer 40 around two axes, can shift the position where the displayed image IM is displayed on the screen SCR in a variety of directions. In the present embodiment, the optical path of the image light LT is shifted four times, so that the apparent number of pixels of the displayed image IM on the screen SCR can be further increased. The projector according to the present embodiment can therefore further increase the resolution of the displayed image IM on the screen SCR.

The projector according to the present embodiment, in which the pixel shifting performed by the pixel shifting device 104 causes the image light LT to be incident on the non-display section A of the displayed image IM, where no image is normally displayed, can cause the non-display section A, which is a portion corresponding to the black matrix of the displayed image IM, to be unlikely to be noticeable.

Furthermore, the projector according to the present embodiment, in which the compact, lightweight pixel shifting device 4 is combined with the single-panel image generator 2 using the single liquid crystal panel 220 as the light modulator 22, can also be a compact, lightweight projector that excels in portability and can display a high-resolution image.

Note in the present embodiment that the pixel shifting device 104 may instead switch the optical path of the image light LT0 from the second shifted optical path SL2 to the reference optical path PL. That is, the pixel shifting device 104 may repeatedly shift the optical path of the image light LT0 output from the reference sub-pixel SG0 sequentially to the reference optical path PL, the first shifted optical path SL1, the second shifted optical path SL2, and the reference optical path PL.

First Variation

Subsequently, as a first variation, a variation of the projector according to the first embodiment will be described. The present variation differs from the first embodiment in terms of the structure of the pixels of the liquid crystal panel and has otherwise the same configurations. The following description will therefore be given to, in addition to the configuration of the liquid crystal panel, an example of the pixel shift operation in a case where the liquid crystal panel is combined with the pixel shifting device. The members common to those in the embodiments described above have the same reference characters and will not be described in detail.

Figures 7, 8:
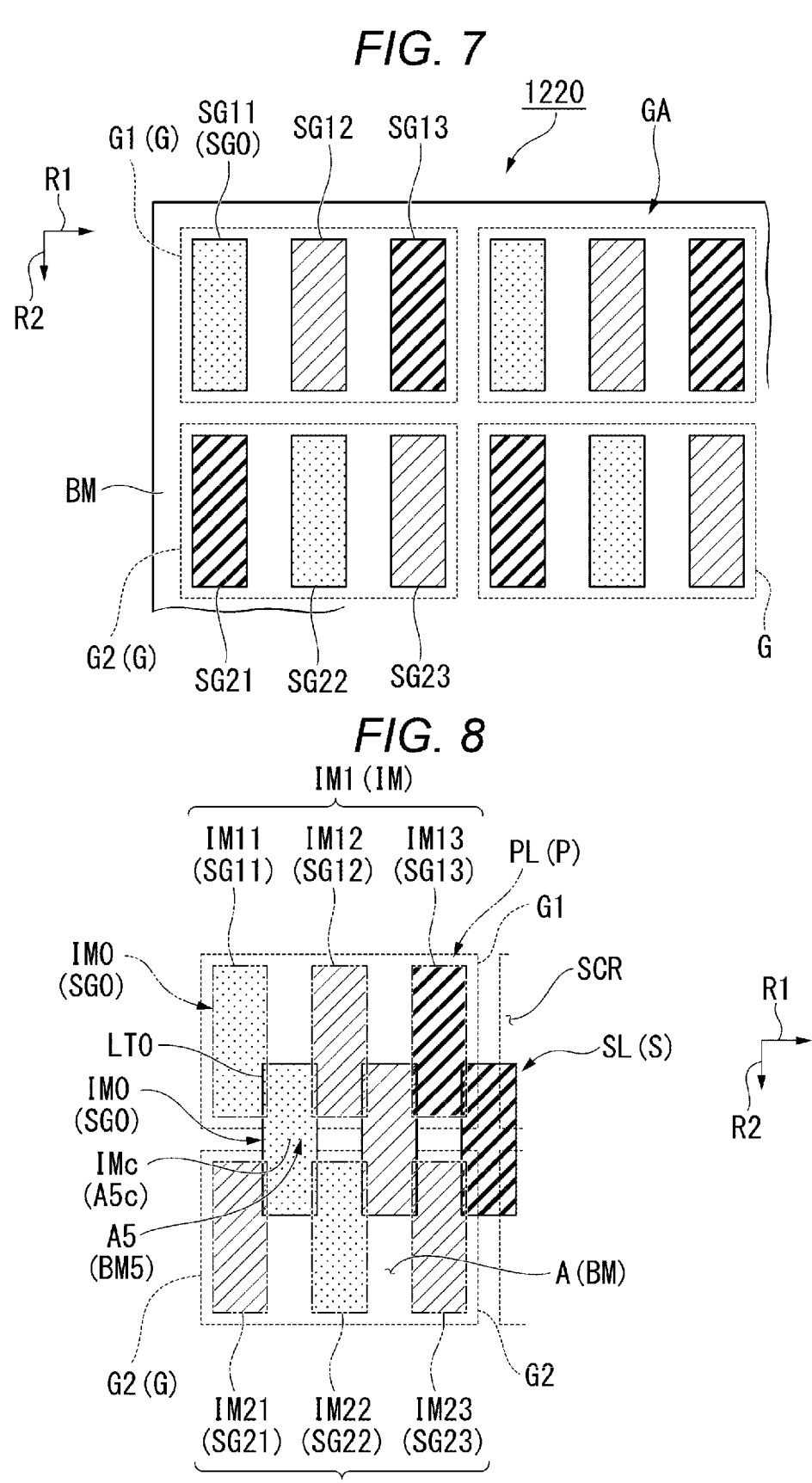
FIG. 7 is a plan view showing the structure of the pixels of the liquid crystal panel in a first variation.
FIG. 8 describes the principle of an increase in the resolution of an image in the first variation.

FIG. 7 is a plan view showing the structure of the pixels of the liquid crystal panel in the present variation.

In the pixel region GA of a liquid crystal panel 1220 in the present variation, the plurality of pixels G are arranged in a matrix in the row direction R1 and the column direction R2 perpendicular to each other, as shown in FIG. 7. The plurality of pixels G include a first pixel G1 and the second pixel G2 adjacent to each other in the column direction R2. The first pixel G1 and the second pixel G2 each include three sub-pixels sequentially arranged in the row direction R1. The pixels G other than the first pixel G1 and the second pixel G2 are each similarly formed of three sub-pixels. It is assumed in the present variation that the three sub-pixels that constitute the first pixel G1 are sub-pixels SG11, SG12 and SG13, and that the three sub-pixels that constitute the second pixel G2 are sub-pixels SG21, SG22 and SG23. The sub-pixels can be formed of the sub-pixel SG11 for red light, the sub-pixel SG12 for green light, the sub-pixel SG13 for blue light, the sub-pixel SG21 for blue light, the sub-pixel SG22 for red light, and the sub-pixel SG23 for green light.

A description will be subsequently given to how the pixel shifting device 4 increases the resolution of an image by using the liquid crystal panel 1220 in the present variation. FIG. 8 shows key portions of an image displayed on the screen SCR.

The displayed image IM on the screen SCR has the same pixel structure as that of the pixel region GA of the liquid crystal panel 1220, as described above. The displayed pixels that constitute the displayed image IM in the variation are each therefore formed of three displayed sub-pixels.

In FIG. 8, out of the plurality of displayed pixels, which constitute the displayed image IM on the screen SCR, the displayed pixel corresponding to the first pixel G1 of the liquid crystal panel 1220 shown in FIG. 7 is the first displayed pixel IM1, and the displayed pixel corresponding to the second pixel G2 of the liquid crystal panel 220 shown in FIG. 3 is a second displayed pixel IM2. FIG. 8 shows only the first displayed pixel IM1 and the second displayed pixel IM2 out of the plurality of displayed pixels that constitute the displayed image IM for clarity of FIG. 8.

It is assumed in FIG. 8 that the displayed sub-pixels corresponding to the three sub-pixels SG11, SG12 and SG13, which constitute the first pixel G1 of the liquid crystal panel 1220, are the first displayed sub-pixels IM11, IM12 and IM13, respectively, and that the displayed sub-pixels corresponding to the three sub-pixels SG21, SG22 and SG23, which constitute the second pixel G2 of the liquid crystal panel 1220, are second displayed sub-pixels IM21, IM22 and IM23, respectively.

In the present variation, the sub-pixel SG11, which is one of the three sub-pixels SG11, SG12, and SG13, which constitute the first pixel G1 shown in FIG. 7, is referred to as the reference sub-pixel SG0. Among the first displayed sub-pixels IM11, IM12, and IM13 of the displayed image IM, the first displayed sub-pixel IM11 corresponding to the reference sub-pixel SG0 is referred to as the reference displayed sub-pixel IM0.

In the present variation, the pixel shifting device 4 superimposes the image light LT0 output from the reference sub-pixel SG0 at the shifted display position S on the region corresponding to the black matrix BM at the reference display position P.

Specifically, the pixel shifting device 4 in the present variation superimposes the image light LT0 output from the reference sub-pixel SG0 at the shifted display position S on the region corresponding to an intersection BM5 of the black matrix BM and surrounded by four corners of the two sub-pixels SG11 and SG12, which are adjacent to each other in the first pixel G1, and the two sub-pixels SG21 and SG22 in the second pixel G2, which are adjacent to the two sub-pixels SG11 and SG12 adjacent to each other in the first pixel G1, at the reference display position P. Note that the intersection BM5 of the black matrix BM corresponds to "a fifth portion of the black matrix".

That is, the pixel shifting device 4 in the present variation superimposes the reference displayed sub-pixel IM0 of the displayed image IM at the shifted display position S on an intersection A5 of the non-display section A, which is surrounded by four corners of the first displayed sub-pixels IM11 and IM12 of the first displayed pixel IM1 and the second displayed sub-pixels IM21 and IM22 of the second displayed pixel IM2 at the reference display position P. During the pixel shifting, the pixel shifting device 4 shifts the optical path of the image light LT by the pixel interval of 0.5 in an oblique direction in which the first displayed sub-pixel IM11 and the second displayed sub-pixel IM22 are obliquely arranged.

In the present variation, the optical axis of the image light LT0 output from the reference sub-pixel SG0 at the shifted display position S is located at the center of the region corresponding to the intersection BM5 of the black matrix BM at the reference display position P. That is, the center IMc of the reference displayed sub-pixel IM0 of the displayed image IM is located at a center A5*c* of the intersection A5 of the non-display section A.

The configuration described above allows the three displayed sub-pixels that constitute each of the displayed pixels of the displayed image IM after the pixel shifting to be efficiently superimposed on the intersection of the non-display section A of the displayed image IM before the pixel shifting. The color mixture in the displayed image IM resulting from the pixel shifting is therefore suppressed, so that the appearance of the displayed image IM can be further improved.

As described above, the pixel shifting device 4 in the present variation can also efficiently superimpose the displayed sub-pixels that constitute each of the displayed pixels of the displayed image IM after the pixel shifting on the non-display section A of the displayed image IM before the pixel shifting to increase the resolution of the displayed image IM while causing the non-display section A of the displayed image IM to be unlikely to be noticeable.

Second Variation

Another variation of the projector according to the first embodiment will be subsequently described as a second variation. The present variation differs from the first variation in terms of the pixel shift operation and has otherwise the same configurations. The following description will therefore be given to the pixel shift operation, and the members common to those in the embodiments described above have the same reference characters and will not be described in detail.

Figure 9:
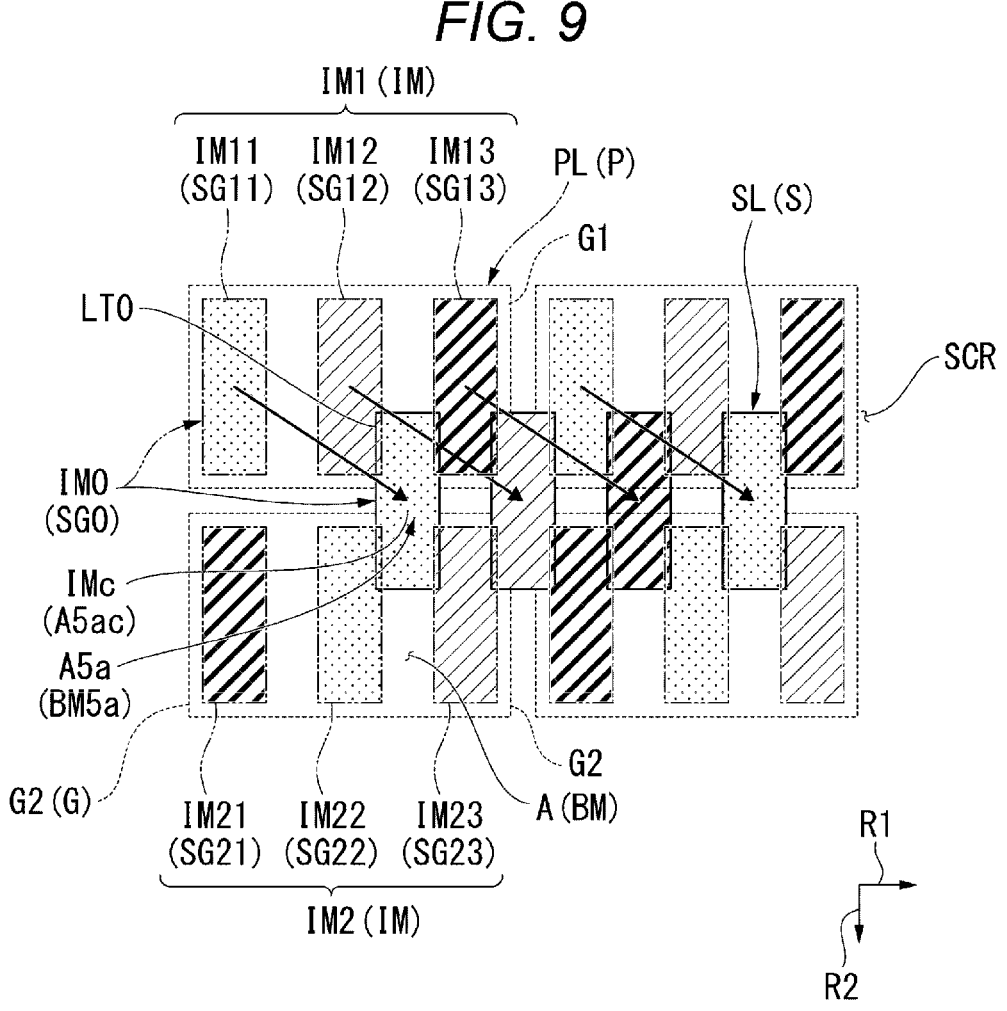
FIG. 9 shows key portions of a displayed image achieved by the pixel shifting in a second variation.

FIG. 9 shows key portions of an image displayed on the screen SCR in the present variation.

The pixel shifting device 4 in the present variation superimposes the image light LT0 output from the reference sub-pixel SG0 at the shifted display position S on the region corresponding to an intersection BM5*a* of the black matrix BM and surrounded by four corners of the two sub-pixels SG12 and SG13, which are adjacent to each other in the first pixel G1, and the two sub-pixels SG22 and SG23 in the second pixel G2, which are adjacent to the two sub-pixels SG12 and SG13 adjacent to each other in the first pixel G1, at the reference display position P, as shown in FIG. 9.

That is, the pixel shifting device 4 in the present variation superimposes the reference displayed sub-pixel IM0 of the displayed image IM at the shifted display position S on the intersection A5*a* of the non-display section A, which is surrounded by four corners of the first displayed sub-pixels IM12 and IM13 of the first displayed pixel IM1 and the second displayed sub-pixels IM22 and IM23 of the second displayed pixel IM2, at the reference display position P. In the present variation, the pixel shifting device 4 performs the pixel shifting by a pixel interval of 1.5 in the direction in which the three displayed sub-pixels of each of the displayed pixels are arranged, and by the pixel interval of 0.5 in the direction in which the first displayed pixel IM1 and the second displayed pixel IM2 are arranged.

In the present variation, the optical axis of the image light LT0 output from the reference sub-pixel SG0 at the shifted display position S is located at the center of the region corresponding to the intersection BM5*a* of the black matrix BM at the reference display position P. That is, the center IMc of the reference displayed sub-pixel IM0 of the displayed image IM is located at a center A5*ac* of the intersection A5*a* of the non-display section A.

According to the configuration described above, the reference displayed sub-pixel IM0 at the shifted display position S overlaps by the same degree with the four displayed sub-pixels IM12, IM13, IM22, and IM23 at the reference display position P, so that color mixture in the displayed image IM resulting from the pixel shifting is suppressed, and the appearance of the displayed image IM can therefore be further improved.

As described above, the pixel shifting device 4 according to the present variation also allows an increase in the resolution of the displayed image IM while causing the non-display section A of the displayed image IM to be unlikely to be noticeable, as in the embodiments and variation described above.

Third Variation

A variation of the projector according to the second embodiment will be subsequently described as a third variation. The present variation differs from the second embodiment in that the liquid crystal panel 1220 in the first variation shown in FIG. 7 is employed, and has otherwise the same configurations. The following description will therefore be given to an example of the pixel shift operation in the configuration in which the liquid crystal panel 1220 in the first variation is combined with the pixel shifting device 104, and the members common to those in the embodiments have the same reference characters and will not be described in detail.

Figure 10:
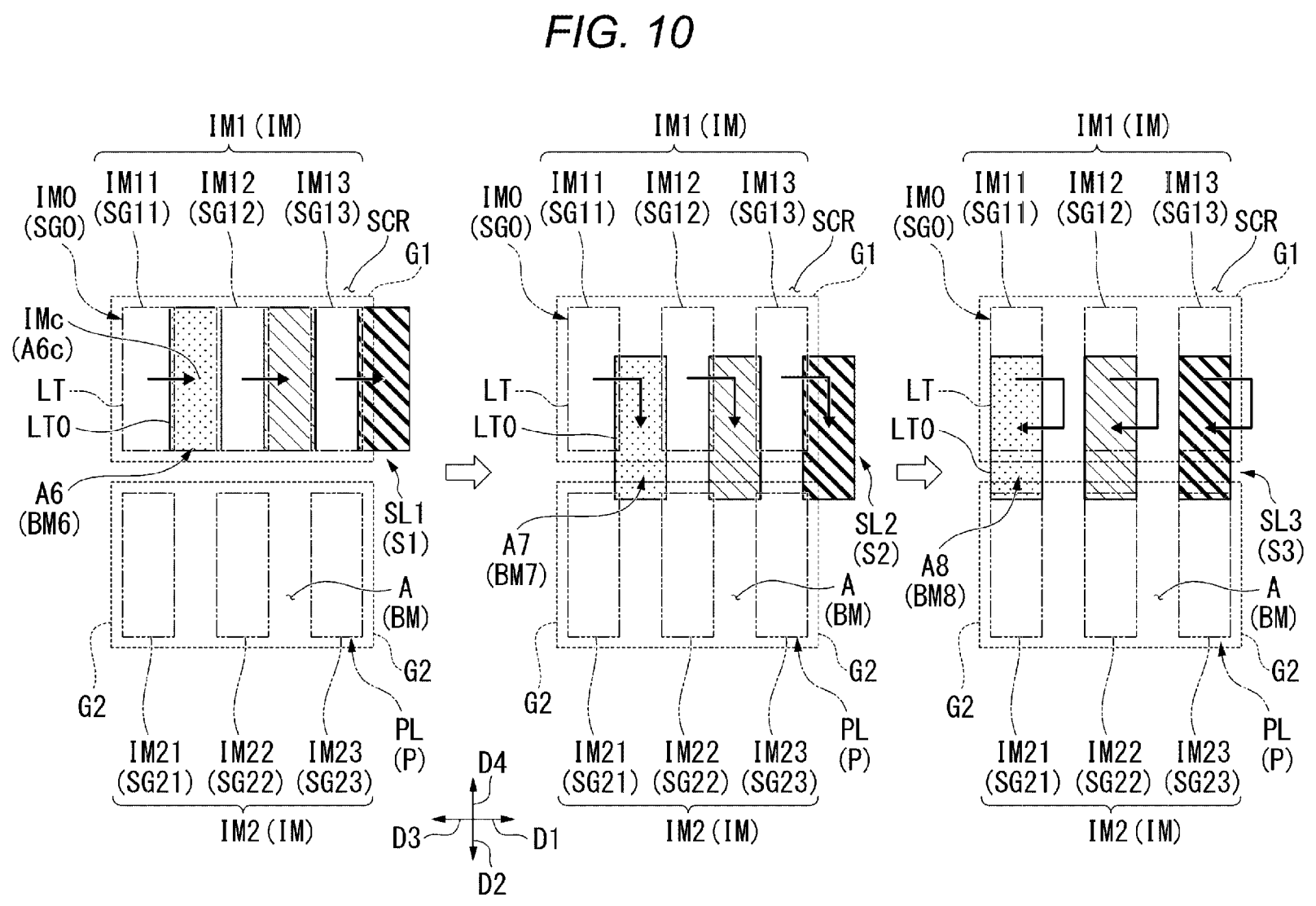

A description will be given to how to increase the resolution of an image in the present variation. FIG. 10 shows key portions of an image displayed on the screen SCR.

In the present variation, the pixel shifting device 104 superimposes the image light LT0 output from the reference sub-pixel SG0 at each of the shifted display positions S1 to S3 on the region corresponding to the black matrix BM at the reference display position P.

Specifically, the pixel shifting device 104 in the present variation superimposes the image light LT0 output from the reference sub-pixel SG0 at the first shifted display position S1 on the region corresponding to a third inter-pixel section BM6 of the black matrix BM and segmenting the two sub-pixels SG11 and SG12, which are adjacent to each other in the first pixel G1, at the reference display position P. Note that the third inter-pixel section BM6 of the black matrix BM corresponds to "a sixth portion of the black matrix".

That is, the pixel shifting device 104 in the present variation superimposes the reference displayed sub-pixel IM0 of the displayed image IM at the first shifted display position S1 on an inter-pixel section A6 of the non-display section A, which segments the first displayed sub-pixels IM11 and IM12 of the first displayed pixel IM1 at the reference display position P. To switch the optical path of the image light LT to the first shifted optical path SL1, the pixel shifting device 104 shifts the optical path of the image light LT by the pixel interval of 0.5 at which displayed sub-pixels are arranged in the first direction D1.

In the present variation, the optical axis of the image light LT0 output from the reference sub-pixel SG0 at the first shifted display position S1 is located at the center of the region corresponding to the third inter-pixel section BM6 of the black matrix BM at the reference display position P. That is, the center IMc of the reference displayed sub-pixel IM0 of the displayed image IM is located at a center A6c of the inter-pixel section A6 of the non-display section A.

According to the configuration described above, the reference displayed sub-pixel IM0 at the first shifted display position S1 overlaps by the same degree with the two displayed sub-pixels IM11 and IM12 at the reference display position P, so that color mixture in the displayed image IM resulting from the pixel shifting is suppressed, and the appearance of the displayed image IM can therefore be further improved.

The pixel shifting device 104 in the present variation subsequently switches the optical path of the image light LT0 output from the reference sub-pixel SG0 to the second shifted optical path SL2. The pixel shifting device 104 shifts the image light LT0 output from the reference sub-pixel SG0 at the second shifted display position S2 from the first shifted optical path SL1 to superimpose the image light LT0 on the region corresponding to an intersection BM7 of the black matrix BM and surrounded by four corners of the two sub-pixels SG11 and SG12, which are adjacent to each other in the first pixel G1, and the two sub-pixels SG21 and SG22 in the second pixel G2, which are adjacent to the two sub-pixels SG11 and SG12 adjacent to each other in the first pixel G1, at the reference display position P. Note that the intersection BM7 of the black matrix BM corresponds to "a seventh portion of the black matrix".

In the present variation, the image light LT0 output from the reference sub-pixel SG0 at the second shifted display position S2 overlaps over a small width with the second displayed sub-pixels IM21 and IM22 of the second displayed pixel IM2 at the reference display position P.

According to the configuration described above, the reference displayed sub-pixel IM0 at the second shifted display position S2 does not overlap by a large amount with the second displayed sub-pixels IM21 and IM22 of the second displayed pixel IM2 at the reference display position P, so that the color mixture resulting from the pixel shifting is suppressed, and the appearance of the displayed image IM can therefore be further improved.

The pixel shifting device 104 in the present variation subsequently switches the optical path of the image light LT0 output from the reference sub-pixel SG0 to the third shifted optical path SL3. The pixel shifting device 104 shifts the image light LT0 output from the reference sub-pixel SG0 at the third shifted display position S3 from the second shifted optical path SL2 to superimpose the image light LT0 on the region corresponding to a fourth inter-pixel section BM8 of the black matrix BM and segmenting the reference sub-pixel SG0 of the first pixel G1 and the sub-pixel SG21 of the second pixel G2, which is adjacent to the reference sub-pixel SG0 of the first pixel G1, at the reference display position P. Note that the fourth inter-pixel section BM8 of the black matrix BM corresponds to "an eighth portion of the black matrix".

That is, the pixel shifting device 104 in the present variation superimposes the reference displayed sub-pixel IM0 of the displayed image IM at the third shifted display position S3 on the inter-pixel section A8 of the non-display section A, which segments the reference displayed sub-pixel IM0 of the first displayed pixel IM1 and the second displayed sub-pixel IM21 of the second displayed pixel IM2 at the reference display position P.

In the present variation, the image light LT0 output from the reference sub-pixel SG0 at the third shifted display position S3 overlaps over a small width with the second displayed sub-pixel IM21 of the second displayed pixel IM2 at the reference display position P.

According to the configuration described above, the reference displayed sub-pixel IM0 at the third shifted display position S3 does not overlap by a large amount with the second displayed sub-pixel IM21 of the second displayed pixel IM2 at the reference display position P, so that the color mixture resulting from the pixel shifting is suppressed, and the appearance of the displayed image IM can therefore be further improved.

The pixel shifting device 104 in the present variation subsequently switches the optical path of the image light LT0 output from the reference sub-pixel SG0 from the third shifted optical path SL3 to the reference optical path PL. Similarly in the following operation, the pixel shifting device 104 repeatedly shifts the optical path of the image light LT0 output from the reference sub-pixel SG0 sequentially to the reference optical path PL, the first shifted optical path SL1, the second shifted optical path SL2, the third shifted optical path SL3, and the reference optical path PL.

As described above, the pixel shifting device 104 in the present variation can also efficiently superimpose the displayed sub-pixels that constitute each of the displayed pixels of the displayed image IM after the pixel shifting on the non-display section A of the displayed image IM before the pixel shifting to increase the resolution of the displayed image IM while causing the non-display section A of the displayed image IM to be unlikely to be noticeable.

Note in the present variation that the pixel shifting device 104 may instead switch the optical path of the image light LT0 from the second shifted optical path SL2 to the reference optical path PL. That is, the pixel shifting device 104 may repeatedly shift the optical path of the image light LT0 output from the reference sub-pixel SG0 sequentially to the reference optical path PL, the first shifted optical path SL1, the second shifted optical path SL2, and the reference optical path PL.

Fourth Variation

Another variation of the projector according to the second embodiment will be subsequently described as a fourth variation. The present variation differs from the third variation in terms of the pixel shift operation and has otherwise the same configurations. The following description will therefore be given to the pixel shift operation, and the members common to those in the embodiments described above have the same reference characters and will not be described in detail.

Figure 11A:
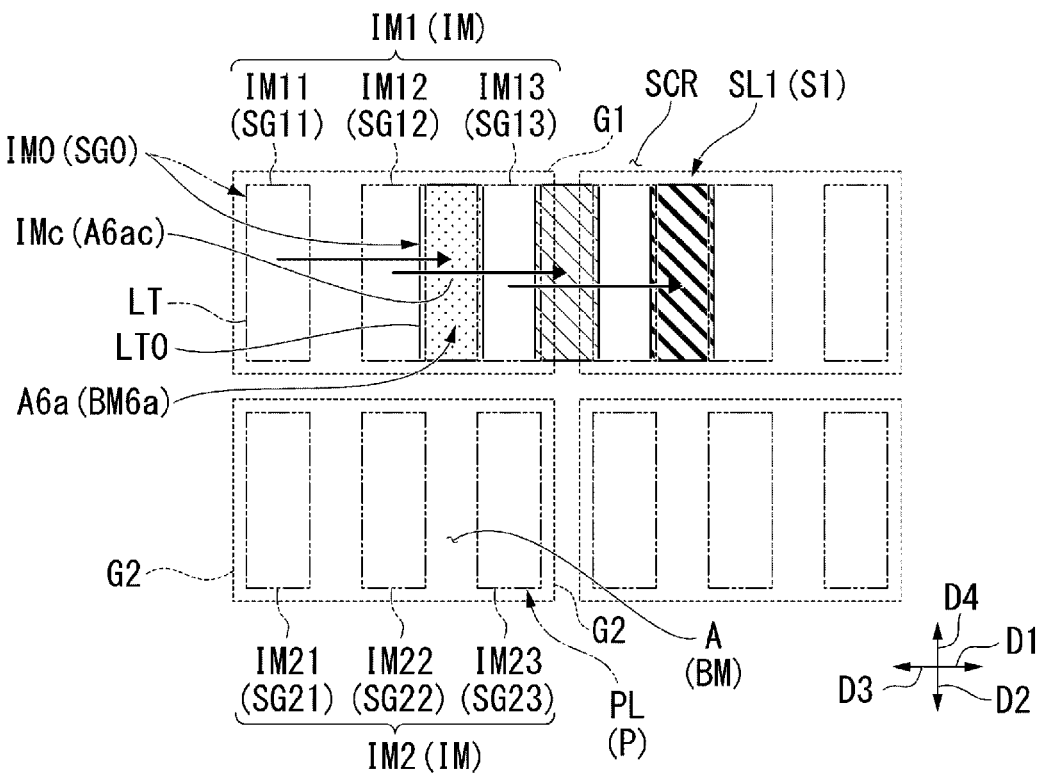
FIG. 11A shows pixel shift operation in a fourth variation.
Figure 11B:
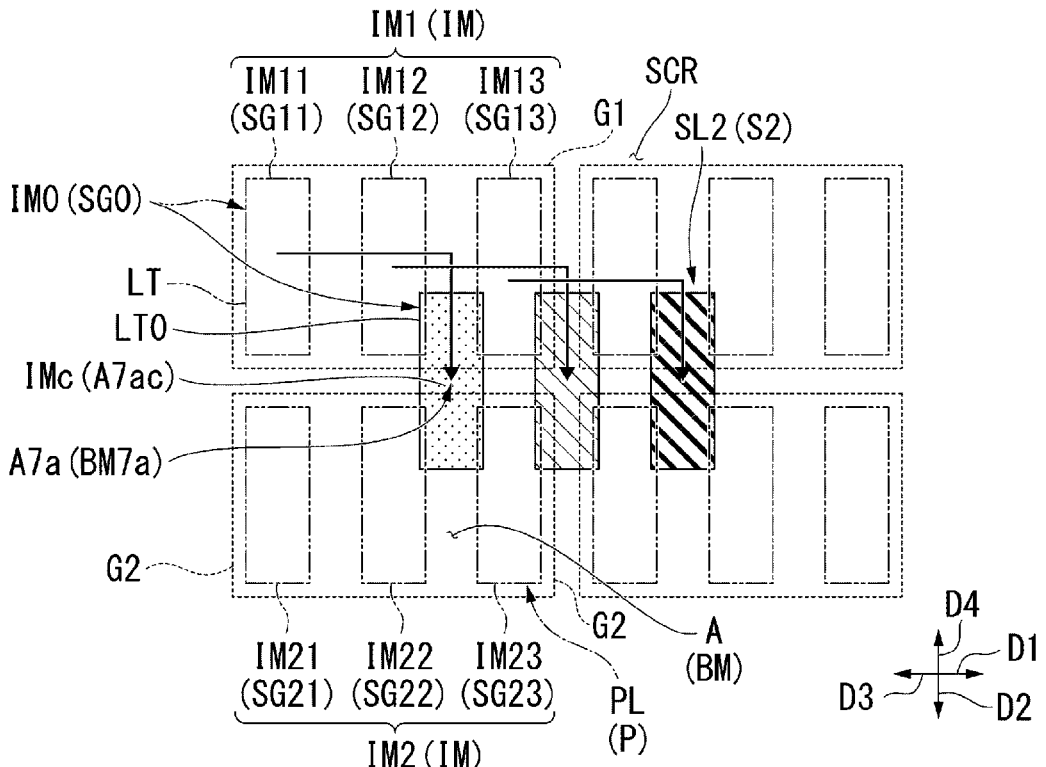
FIG. 11B shows the pixel shift operation in the fourth variation.
Figure 11C:
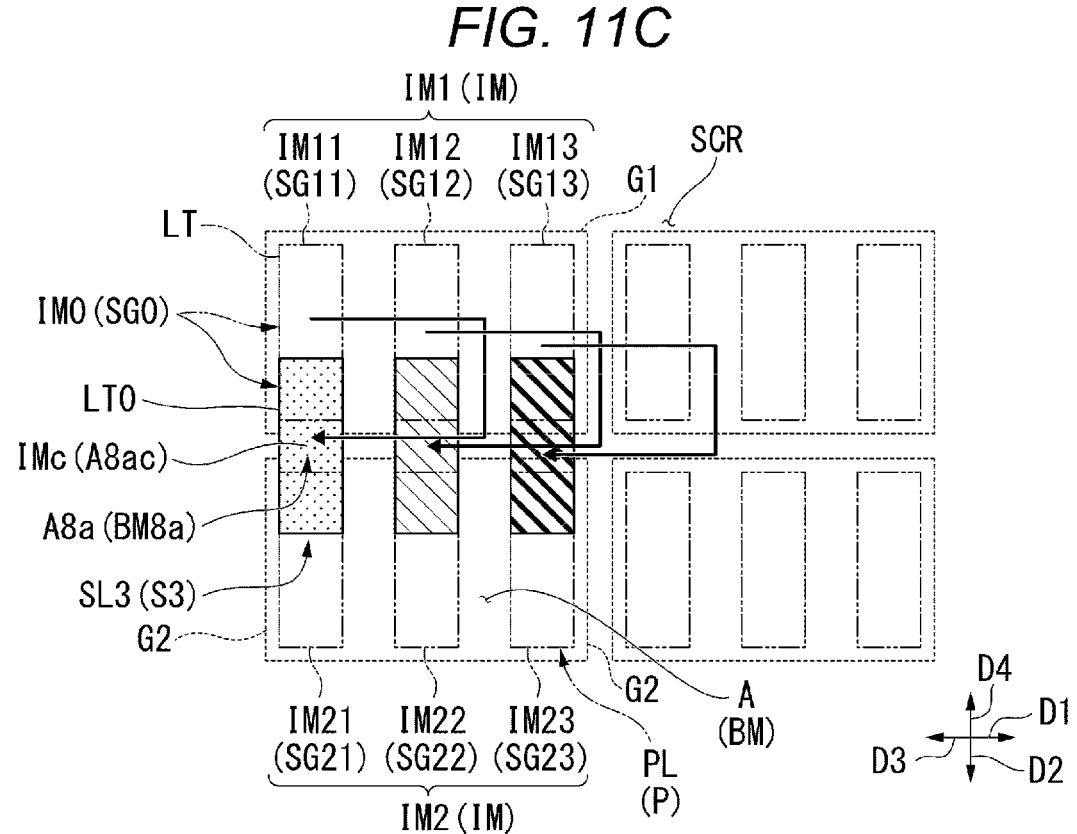
FIG. 11C shows the pixel shift operation in the fourth variation.

FIGS. 11A to 11C show the pixel shift operation in the present variation.

The pixel shifting device 104 in the present variation superimposes the image light LT0 output from the reference sub-pixel SG0 at the first shifted display position S1 on the region corresponding to an inter-pixel section BM6a of the black matrix BM and segmenting the two sub-pixels SG12 and SG13, which are adjacent to each other in the first pixel G1, at the reference display position P, as shown in FIG. 11A. To switch the optical path of the image light LT to the first shifted optical path SL1, the pixel shifting device 104 shifts the optical path of the image light LT by the pixel interval of 1.5 at which displayed sub-pixels are arranged in the first direction D1.

In the present variation, the optical axis of the image light LT0 output from the reference sub-pixel SG0 at the first shifted display position S1 is located at the center 4 the region corresponding to the inter-pixel section BM6a of the black matrix BM at the reference display position P. That is, the center IMc of the reference displayed sub-pixel IM0 of the displayed image IM is located at a center A6ac of the inter-pixel section A6a of the non-display section A.

According to the configuration described above, the reference displayed sub-pixel IM0 at the first shifted display position S1 overlaps by the same degree with the two displayed sub-pixels IM12 and IM13 at the reference display position P, so that color mixture in the displayed image IM resulting from the pixel shifting is suppressed, and the appearance of the displayed image IM can therefore be further improved.

The pixel shifting device 104 in the present variation superimposes the image light LT0 output from the reference sub-pixel SG0 at the second shifted display position S2 on the region corresponding to the intersection BM7 of the black matrix BM and surrounded by four corners of the two sub-pixels SG12 and SG13, which are adjacent to each other in the first pixel G1 and the two sub-pixels SG22 and SG23 in the second pixel G2, which are adjacent to the two sub-pixels SG12 and SG13 adjacent to each other in the first pixel G1, at the reference display position P, as shown in FIG. 11B. To switch the optical path of the image light LT to the second shifted optical path SL2, the pixel shifting device 104 shifts the optical path of the image light LT by the pixel interval of 0.5 at which displayed pixels are arranged in the second direction D2.

In the present variation, the optical axis of the image light LT0 output from the reference sub-pixel SG0 at the second shifted display position $2 is located at the center of the region corresponding to an intersection BM7a of the black matrix BM at the reference display position P. That is, the center IMc of the reference displayed sub-pixel IM0 of the displayed image IM is located at a center A7ac of the intersection Ala of the non-display section A.

According to the configuration described above, the reference displayed sub-pixel IM0 at the second shifted display position S2 overlaps by the same degree with the four displayed sub-pixels IM12, IM13, IM22, and IM23 at the reference display position P, so that color mixture in the displayed image IM resulting from the pixel shifting is suppressed, and the appearance of the displayed image IM can therefore be further improved.

The pixel shifting device 104 in the present variation superimposes the image light LT0 output from the reference sub-pixel SG0 at the third shifted display position S3 on the region corresponding to a fourth inter-pixel section BM8a of the black matrix BM and segmenting the reference sub-pixel SG0 of the first pixel G1 and the sub-pixel SG21 of the second pixel G2, which is adjacent to the reference sub-pixel SG0 of the first pixel G1, at the reference display position P, as shown in FIG. 11C. To switch the optical path of the image light LT to the third shifted optical path SL3, the pixel shifting device 104 shifts the optical path of the image light LT by the pixel interval of 1.5 at which displayed sub-pixels are arranged in the third direction D3.

In the present variation, the optical axis of the image light LT0 output from the reference sub-pixel SG0 at the third shifted display position S3 is located at the center of the region corresponding to the fourth inter-pixel section BM8a of the black matrix BM at the reference display position P. That is, the center IMc of the reference displayed sub-pixel IM0 of the displayed image IM is located at a center A8ac of an inter-pixel section A8a of the non-display section A.

According to the configuration described above, the reference displayed sub-pixel IM0 at the third shifted display position S3 overlaps by the same degree with the two displayed sub-pixels IM11 and IM21 at the reference display position P, so that color mixture in the displayed image IM resulting from the pixel shifting is suppressed, and the appearance of the displayed image IM can therefore be further improved.

As described above, even when the pixel shift operation in the present variation is performed, the resolution of an image can be increased with the non-display section A of the displayed image IM caused to be unlikely to be noticeable, as in the embodiments and variations described above.

The technical scope of the present disclosure is not limited to the embodiments described above, and a variety of changes can be made thereto to the extent that the changes do not depart from the intent of the present disclosure.

In addition to the above, the number, arrangement, shape, material, and other specific factors of the variety of components that constitute the projector are not limited to those in the embodiments described above and can be changed as appropriate.

For example, the direction in which the image light LT is shifted by the pixel shifting device 4 in the first embodiment is not limited to the direction in the aspect described above. The direction in which the image light LT is shifted can be adjusted as appropriate in accordance with the positional relationship between the optical path changer 40 and the first swing axis J1 and the direction in which the optical path changer 40 is rotated around the first swing axis J1.

Similarly, the direction in which the image light LT is shifted by the pixel shifting device 104 in the second embodiment is not limited to the direction in the aspect described above. The direction in which the image light LT is shifted can be adjusted as appropriate in accordance with the combination of the positional relationship of the optical path changer 40 with the first swing axis J1 and the second swing axis J2 and the direction in which the optical path changer 40 is rotated around the first swing axis J1 or the second swing axis J2.

The case where the pixels G in the pixel region GA of the liquid crystal panel 1220 in the first variation are each formed of three sub-pixels arranged in the row direction R1 has been presented by way of example, and the pixels G may each be formed of four sub-pixels. For example, the four sub-pixels output red, blue, yellow, and green image light.

In the embodiments and variations described above, reflective devices that reflect the image light LT have been presented as the pixel shifting devices 4 and 104, but transmissive devices that transmit the image light LT may be employed. Such a transmissive pixel shifting device can shift the optical path of the image light LT with the aid of refraction by changing the posture of the optical path changer made of a glass plate.

The present disclosure will be summarized below as additional remarks.

Additional Remark 1

A projector including a light source, a single light modulator that has a pixel region containing a plurality of pixels and modulates light output from the light source based on an image signal to generate image light, a pixel shifting device configured to switch the optical path of the image light output from the light modulator to a reference optical path or a shifted optical path, and a projection system that projects the image light incident from the pixel shifting device onto a projection receiving surface, a plurality of sub-pixels that are segmented by a black matrix and output light having different colors forming each of the pixels in the pixel region of the light modulator, the pixel shifting device positioning the image light traveling along the reference optical path at a reference display position on the projection receiving surface and positioning the image light traveling along the shifted optical path at a shifted display position on the projection receiving surface to superimpose the image light output from the sub-pixels at the shifted display position on the region corresponding to the black matrix at the reference display position.

According to the thus configured projector, the pixel shifting device can increase the apparent number of pixels of an image displayed on the projection receiving surface to improve the resolution of the image by shifting the optical path of the image light to switch the image display position.

Furthermore, causing the image light to be incident on the region corresponding to the black matrix of the light modulator, where no image is normally displayed, allows the non-display section corresponding to the black matrix in the displayed image to be unlikely to be noticeable. The appearance of the displayed image can therefore be further improved.

Therefore, according to the thus configured projector, combining the compact, lightweight pixel shifting device with the single light modulator can provide a compact, lightweight projector that excels in portability and projects a high-resolution, high-quality image.

Additional Remark 2

The projector described in the additional remark 1, in which the pixels in the pixel region are each formed of four of the sub-pixels, the four sub-pixels disposed on diagonal lines that intersect with each other and form two pairs.

According to the configuration described above, using the light modulator having the pixel region in which the pixels are each formed of four sub-pixels allows increases in resolution and image quality of a displayed image.

Additional Remark 3

The projector described in the additional remark 2, in which one of the four sub-pixels, which constitute a first pixel that is one of the plurality of pixels, is assumed to be a reference sub-pixel, and the pixel shifting device shifts the optical path of the image light output from the reference sub-pixel in one direction relative to the reference optical path to form the shifted optical path to superimpose the image light output from the reference sub-pixel at the shifted display position on the region corresponding to a first portion of the black matrix at the reference display position, the first portion surrounded by corners of the four sub-pixels, which constitute the first pixel.

According to the configuration described above, the pixel shifting allows the image light to be efficiently superimposed on the first portion of the black matrix, which is located between the four sub-pixels of the displayed image, before the pixel shifting. Occurrence of color mixture due to the superposition of the image light before the pixel shifting on the image light after the pixel shifting can therefore be suppressed.

Additional Remark 4

The projector described in the additional remark 3, in which the optical axis of the image light output from the reference sub-pixel at the shifted display position is located at the center of the region corresponding to the first portion.

According to the configuration described above, since the image light is efficiently superimposed on the first portion of the black matrix, the occurrence of the color mixture is suppressed, and the appearance of the displayed image can therefore be further improved.

Additional Remark 5

The projector described in the additional remark 2, in which one of the four sub-pixels, which constitute a first pixel that is one of the plurality of pixels, is assumed to be a reference sub-pixel, the pixel shifting device is configured to switch the optical path of the image light output from the reference sub-pixel to the shifted optical path formed of a first shifted optical path as a result of shifting the optical path of the image light in a first direction relative to the reference optical path and a second shifted optical path as a result of shifting the optical path of the image light in a second direction different from the first direction relative to the first shifted optical path, and positions the image light traveling along the first shifted optical path at a first shifted display position on the projection receiving surface, and positions the image light traveling along the second shifted optical path at a second shifted display position on the projection receiving surface, and the first shifted optical path causes the image light output from the reference sub-pixel at the first shifted display position to be superimposed on the region corresponding to a second portion of the black matrix at the reference display position, the second portion segmenting two of the sub-pixels adjacent to each other out of the four sub-pixels that constitute the first pixel, and the second shifted optical path causes the image light output from the reference sub-pixel at the second shifted display position to be shifted from the first shifted optical path and superimposed on the region corresponding to a third portion of the black matrix at the reference display position, the third portion surrounded by corners of the four sub-pixels that constitute the first pixel.

According to the configuration described above, the pixel shifting allows the image light to be efficiently superimposed on the second and third portions of the black matrix, the two portions each located between four sub-pixels of the displayed image before the pixel shifting. The resolution of the displayed image can therefore be increased with the occurrence of the color mixture due to the superposition of the image light before the pixel shifting on the image light after the pixel shifting suppressed.

Additional Remark 6

The projector described in the additional remark 5, in which the optical axis of the image light output from the reference sub-pixel at the first shifted display position is located at the center of the region corresponding to the second portion, and the optical axis of the image light output from the reference sub-pixel at the second shifted display position is located at the center of the region corresponding to the third portion.

According to the configuration described above, since the image light is efficiently superimposed on the second and third portions of the black matrix, the occurrence of the color mixture is suppressed, and the appearance of the displayed image can therefore be further improved.

Additional Remark 7

The projector described in the additional remark 5 or 6, in which the pixel shifting device is configured to further switch the optical path of the image light output from the reference sub-pixel to a third shifted optical path, as the shifted optical path, as a result of shifting the optical path of the image light in a third direction different from the first and second directions relative to the reference optical path, and positions the image light traveling along the third shifted optical path at a third shifted display position on the projection receiving surface, and the third shifted optical path causes the image light output from the reference sub-pixel at the third shifted display position to be shifted from the second shifted optical path and superimposed on the region corresponding to a fourth portion of the black matrix different from the second portion at the reference display position, the fourth portion segmenting two of the sub-pixels adjacent to each other out of the four sub-pixels that constitute the first pixel.

According to the configuration described above, the image light can be superimposed on three portions of the black matrix that are each segmented between the four sub-pixels of the displayed image. The resolution of the displayed image can therefore be increased with the occurrence of the color mixture due to the superposition of the image light before the pixel shifting on the image light after the pixel shifting suppressed.

Additional Remark 8

The projector described in the additional remark 7, in which the optical axis of the image light output from the reference sub-pixel at the third shifted display position is located at the center of the region corresponding to the fourth portion of the black matrix.

According to the configuration described above, since the image light is efficiently superimposed on the fourth portion of the black matrix, the occurrence of the color mixture is suppressed, and the appearance of the displayed image can therefore be further improved.

Additional Remark 9

The projector described in the additional remark 1, in which the plurality of pixels in the pixel region of the light modulator are arranged in a row direction and a column direction perpendicular to each other, the plurality of pixels include a first pixel and a second pixel adjacent to each other in the column direction, and the first pixel and the second pixel each include at least three of the sub-pixels sequentially arranged in the row direction.

According to the configuration described above, using the light modulator having the pixel region including a plurality of pixels each including at least three sub-pixels arranged in the row direction allows increases in resolution and image quality of a displayed image.

Additional Remark 10

The projector described in the additional remark 9, in which one of the plurality of sub-pixels in the first pixel is assumed to be a reference sub-pixel, and the pixel shifting device shifts the optical path of the image light output from the reference sub-pixel in one direction relative to the reference optical path to form the shifted optical path to superimpose the image light output from the reference sub-pixel at the shifted display position on the region corresponding to a fifth portion of the black matrix at the reference display position, the fifth portion surrounded by corners of two sub-pixels adjacent to each other in the first pixel and corners of two sub-pixels in the second pixel that are adjacent to the two sub-pixels adjacent to each other in the first pixel.

According to the configuration described above, the pixel shifting allows the image light to be efficiently superimposed on the cross-shaped fifth portion of the black matrix where four sub-pixels of the displayed image before the pixel shifting are located. The resolution of the displayed image can therefore be increased with the occurrence of the color mixture due to the superposition of the image light before the pixel shifting on the image light after the pixel shifting suppressed.

Additional Remark 11

The projector described in the additional remark 10, in which the optical axis of the image light output from the reference sub-pixel at the shifted display position is located at the center of the region corresponding to the fifth portion.

According to the configuration described above, since the image light is efficiently superimposed on the fifth portion of the black matrix, the occurrence of the color mixture is suppressed, and the appearance of the displayed image can therefore be further improved.

Additional Remark 12

The projector described in the additional remark 9, in which one of the plurality of sub-pixels in the first pixel is assumed to be a reference sub-pixel, the pixel shifting device is configured to switch the optical path of the image light output from the reference sub-pixel to the shifted optical path formed of a first shifted optical path as a result of shifting the optical path of the image light in a first direction relative to the reference optical path and a second shifted optical path as a result of shifting the optical path of the image light in a second direction different from the first direction relative to the first shifted optical path, and positions the image light traveling along the first shifted optical path at a first shifted display position on the projection receiving surface, and positions the image light traveling along the second shifted optical path at a second shifted display position on the projection receiving surface, the first shifted optical path causes the image light output from the reference sub-pixel at the first shifted display position to be superimposed on the region corresponding to a sixth portion of the black matrix at the reference display position, the sixth portion segmenting two sub-pixels adjacent to each other in the first pixel, and the second shifted optical path causes the image light output from the reference sub-pixel at the second shifted display position to be shifted from the first shifted optical path and superimposed on the region corresponding to a seventh portion of the black matrix at the reference display position, the seventh portion surrounded by corners of two sub-pixels adjacent to each other in the first pixel and corners of two sub-pixels in the second pixel that are adjacent to the two sub-pixels adjacent to each other in the first pixel.

According to the configuration described above, the pixel shifting allows the image light to be efficiently superimposed on the sixth and seventh portions of the black matrix, which are each located between two adjacent sub-pixels of the displayed image before the pixel shifting. The resolution of the displayed image can therefore be increased with the occurrence of the color mixture due to the superposition of the image light before the pixel shifting on the image light after the pixel shifting suppressed.

Additional Remark 13

The projector described in the additional remark 12, in which the optical axis of the image light output from the reference and traveling along the first shifted optical path is located at the center of the region corresponding to the sixth portion, and the optical axis of the image light output from the reference sub-pixel and traveling along the second shifted optical path is located at the center of the region corresponding to the seventh portion.

According to the configuration described above, since the image light is efficiently superimposed on the sixth and seventh portions of the black matrix, the occurrence of the color mixture is suppressed, and the appearance of the displayed image can therefore be further improved.

Additional Remark 14

The projector described in the additional remark 12 or 13, in which the amount of shift in the first direction differs from the amount of shift in the second direction.

According to the configuration described above, even when the amount of shift in the first direction differ from the amount of shift in the second direction, the image light is incident on the region of the light modulator that corresponds to the black matrix, where no image is normally displayed, so that the occurrence of the color mixture is suppressed, and the appearance of the displayed image can therefore be further improved.

Additional Remark 15

The projector described in any one of the additional remarks 12 to 14, in which the pixel shifting device is configured to further switch the optical path of the image light output from the reference sub-pixel to a third shifted optical path, as the shifted optical path, as a result of shifting the optical path of the image light in a third direction different from the first and second directions relative to the reference optical path, and positions the image light traveling along the third shifted optical path at a third shifted display position on the projection receiving surface, and the third shifted optical path causes the image light output from the reference sub-pixel at the third shifted display position to be shifted from the second shifted optical path and superimposed on the region corresponding to an eighth portion of the black matrix at the reference display position, the eighth portion segmenting the reference sub-pixel of the first pixel and the sub-pixel of the second pixel that is adjacent to the reference sub-pixel of the first pixel.

According to the configuration described above, the image light can be superimposed on three portions of the black matrix that each segment two adjacent sub-pixels of adjacent pixels of the displayed image. The resolution of the displayed image can therefore be increased with the occurrence of the color mixture due to the superposition of the image light before the pixel shifting on the image light after the pixel shifting suppressed.

Additional Remark 16

The projector described in the additional remark 15, in which the optical axis of the image light output from the reference sub-pixel and traveling along the third shifted optical path is located at the center of the region corresponding to the eighth portion.

According to the configuration described above, since the image light is efficiently superimposed on the eighth portion of the black matrix, the occurrence of the color mixture is suppressed, and the appearance of the displayed image can therefore be further improved.

What is claimed is:

1. A projector comprising:
a light source;
a single light modulator that has a pixel region containing a plurality of pixels and modulates light output from the light source to generate image light;
a pixel shifting device configured to switch an optical path of the image light output from the light modulator between a reference optical path and a shifted optical path; and
a projection system that projects the image light incident from the pixel shifting device onto a projection receiving surface,
wherein a plurality of sub-pixels that are segmented by a black matrix and output light having different colors form each of the pixels in the pixel region of the light modulator,
the pixel shifting device positions the image light traveling along the reference optical path at a reference display position on the projection receiving surface and positions the image light traveling along the shifted optical path at a shifted display position on the projection receiving surface to
superimpose the image light output from the sub-pixels at the shifted display position on a region corresponding to the black matrix at the reference display position.

2. The projector according to claim 1,
wherein the pixels in the pixel region are each formed of four of the sub-pixels, the four sub-pixels disposed on diagonal lines that intersect with each other and form two pairs.

3. The projector according to claim 2,
wherein one of the four sub-pixels, which constitute a first pixel that is one of the plurality of pixels, is assumed to be a reference sub-pixel, and
the pixel shifting device
shifts the optical path of the image light output from the reference sub-pixel in one direction relative to the reference optical path to form the shifted optical path to superimpose the image light output from the reference sub-pixel at the shifted display position on a region corresponding to a first portion of the black matrix at the reference display position, the first portion surrounded by corners of the four sub-pixels, which constitute the first pixel.

4. The projector according to claim 3,
wherein an optical axis of the image light output from the reference sub-pixel at the shifted display position is located at the center of the region corresponding to the first portion.

5. The projector according to claim 2, wherein one of the four sub-pixels, which constitute a first pixel that is one of the plurality of pixels, is assumed to be a reference sub-pixel, the pixel shifting device is configured to switch the optical path of the image light output from the reference sub-pixel to the shifted optical path formed of a first shifted optical path as a result of shifting the optical path of the image light in a first direction relative to the reference optical path and a second shifted optical path as a result of shifting the optical path of the image light in a second direction different from the first direction relative to the first shifted optical path, and positions the image light traveling along the first shifted optical path at a first shifted display position on the projection receiving surface, and positions the image light traveling along the second shifted optical path at a second shifted display position on the projection receiving surface, and the first shifted optical path causes the image light output from the reference sub-pixel at the first shifted display position to be superimposed on a region corresponding to a second portion of the black matrix at the reference display position, the second portion segmenting two of the sub-pixels adjacent to each other out of the four sub-pixels that constitute the first pixel, and the second shifted optical path causes the image light output from the reference sub-pixel at the second shifted display position to be shifted from the first shifted optical path and superimposed on the region corresponding to a third portion of the black matrix at the reference display position, the third portion surrounded by corners of the four sub-pixels that constitute the first pixel.

6. The projector according to claim 5, wherein an optical axis of the image light output from the reference sub-pixel at the first shifted display position is located at a center of the region corresponding to the second portion, and the optical axis of the image light output from the reference sub-pixel at the second shifted display position is located at a center of the region corresponding to the third portion.

7. The projector according to claim 5, wherein the pixel shifting device is configured to further switch the optical path of the image light output from the reference sub-pixel to a third shifted optical path, as the shifted optical path, as a result of shifting the optical path of the image light in a third direction different from the first and second directions relative to the reference optical path, and positions the image light traveling along the third shifted optical path at a third shifted display position on the projection receiving surface, and the third shifted optical path causes the image light output from the reference sub-pixel at the third shifted display position to be shifted from the second shifted optical path and superimposed on a region corresponding to a fourth portion of the black matrix different from the second portion at the reference display position, the fourth portion segmenting two of the sub-pixels adjacent to each other out of the four sub-pixels that constitute the first pixel.

8. The projector according to claim 7, wherein the optical axis of the image light output from the reference sub-pixel at the third shifted display position is located at a center of the region corresponding to the fourth portion of the black matrix.

9. The projector according to claim 1, wherein the plurality of pixels in the pixel region of the light modulator are arranged in a row direction and a column direction perpendicular to each other, the plurality of pixels include a first pixel and a second pixel adjacent to each other in the column direction, and the first pixel and the second pixel each include at least three of the sub-pixels sequentially arranged in the row direction.

10. The projector according to claim 9, wherein one of the plurality of sub-pixels in the first pixel is assumed to be a reference sub-pixel, and the pixel shifting device shifts the optical path of the image light output from the reference sub-pixel in one direction relative to the reference optical path to form the shifted optical path to superimpose the image light output from the reference sub-pixel at the shifted display position on a region corresponding to a fifth portion of the black matrix at the reference display position, the fifth portion surrounded by corners of two sub-pixels adjacent to each other in the first pixel and corners of two sub-pixels in the second pixel that are adjacent to the two sub-pixels adjacent to each other in the first pixel.

11. The projector according to claim 10, wherein the optical axis of the image light output from the reference sub-pixel at the shifted display position is located at a center of the region corresponding to the fifth portion.

12. The projector according to claim 9, wherein one of the plurality of sub-pixels in the first pixel is assumed to be a reference sub-pixel, the pixel shifting device is configured to switch the optical path of the image light output from the reference sub-pixel to the shifted optical path formed of a first shifted optical path as a result of shifting the optical path of the image light in a first direction relative to the reference optical path and a second shifted optical path as a result of shifting the optical path of the image light in a second direction different from the first direction relative to the first shifted optical path, and positions the image light traveling along the first shifted optical path at a first shifted display position on the projection receiving surface, and positions the image light traveling along the second shifted optical path at a second shifted display position on the projection receiving surface, the first shifted optical path causes the image light output from the reference sub-pixel at the first shifted display position to be superimposed on a region corresponding to a sixth portion of the black matrix at the reference display position, the sixth portion segmenting two sub-pixels adjacent to each other in the first pixel, and the second shifted optical path causes the image light output from the reference sub-pixel at the second shifted display position to be shifted from the first shifted optical path and superimposed on a region corresponding to a seventh portion of the black matrix at the reference display position, the seventh portion surrounded by corners of two sub-pixels adjacent to each other in the first pixel and corners of two sub-pixels in the second pixel that are adjacent to the two sub-pixels adjacent to each other in the first pixel.

13. The projector according to claim 12, wherein the optical axis of the image light output from the reference sub-pixel and traveling along the first shifted optical path is located at a center of the region corresponding to the sixth portion, and the optical axis of the image light output from the reference sub-pixel and traveling along the second shifted optical path is located at a center of the region corresponding to the seventh portion.

14. The projector according to claim 12, wherein an amount of shift in the first direction differs from an amount of shift in the second direction.

15. The projector according to claim 12, wherein the pixel shifting device is configured to further switch the optical path of the image light output from the reference sub-pixel to a third shifted optical path, as the shifted optical path, as a result of shifting the optical path of the image light in a third direction different from the first and second directions relative to the reference optical path, and positions the image light traveling along the third shifted optical path at a third shifted display position on the projection receiving surface, and the third shifted optical path causes the image light output from the reference sub-pixel at the third shifted display position to be shifted from the second shifted optical path and superimposed on a region corresponding to an eighth portion of the black matrix at the reference display position, the eighth portion segmenting the reference sub-pixel of the first pixel and the sub-pixel of the second pixel that is adjacent to the reference sub-pixel of the first pixel.

16. The projector according to claim 15, wherein the optical axis of the image light output from the reference sub-pixel and traveling along the third shifted optical path is located at a center of the region corresponding to the eighth portion.

* * * * *